(12) United States Patent
Bito et al.

(10) Patent No.: US 7,206,139 B2
(45) Date of Patent: Apr. 17, 2007

(54) ZOOM LENS SYSTEM AND LENS BARREL HAVING THE SAME

(75) Inventors: Takakazu Bito, Osaka (JP); Keiki Yoshitsugu, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/454,101

(22) Filed: Jun. 16, 2006

(65) Prior Publication Data

US 2006/0285221 A1  Dec. 21, 2006

(30) Foreign Application Priority Data

Jun. 17, 2005  (JP)  ............... 2005-178153
May 23, 2006  (JP)  ............... 2006-142596

(51) Int. Cl.
*G02B 15/14*  (2006.01)

(52) U.S. Cl. ...................... 359/690; 359/687

(58) Field of Classification Search ........ 359/687, 359/688, 690

See application file for complete search history.

(56) References Cited

U.S. PATENT DOCUMENTS

| 3,709,131 A | 1/1973 | Plummer |
| 6,333,823 B1 * | 12/2001 | Ozaki et al. ............ 359/690 |
| 2003/0147146 A1 | 8/2003 | Mikami |
| 2003/0156832 A1 | 8/2003 | Nomura et al. |
| 2003/0161620 A1 | 8/2003 | Hagimori et al. |
| 2005/0036777 A1 | 2/2005 | Nomura et al. |

FOREIGN PATENT DOCUMENTS

| JP | 55-52041 | 4/1980 |
| JP | 58-76824 | 5/1983 |
| JP | 2003-156789 | 5/2003 |
| JP | 2003-169236 | 6/2003 |
| JP | 2003-315861 | 6/2003 |
| JP | 2003-202500 A | 7/2003 |
| JP | 2004-102089 | 2/2004 |
| JP | 2004-118101 | 4/2004 |

\* cited by examiner

*Primary Examiner*—Scott J. Sugarman
(74) *Attorney, Agent, or Firm*—McDermott Will & Emery LLP

(57) ABSTRACT

A zoom lens system, in order from the object side to the image side, comprises: a first lens unit having positive optical power; a second lens unit that includes a reflective optical element having a reflecting surface for bending object light and that has negative optical power; and a subsequent lens unit including more than one lens unit having positive optical power, and that satisfies the condition: $-5.70<f_1/f_2<-2.00$ ($Z=f_T/f_W>5.0$, $f_1$ is the composite focal length of the first lens unit, $f_2$ is the composite focal length of the second lens unit, $f_W$ is the focal length of the entire zoom lens system at a wide-angle limit, $f_T$ is the focal length of the entire zoom lens system at a telephoto limit, Z is the magnification variation ratio), and is held in a compact lens barrel.

20 Claims, 24 Drawing Sheets

FIG. 18A
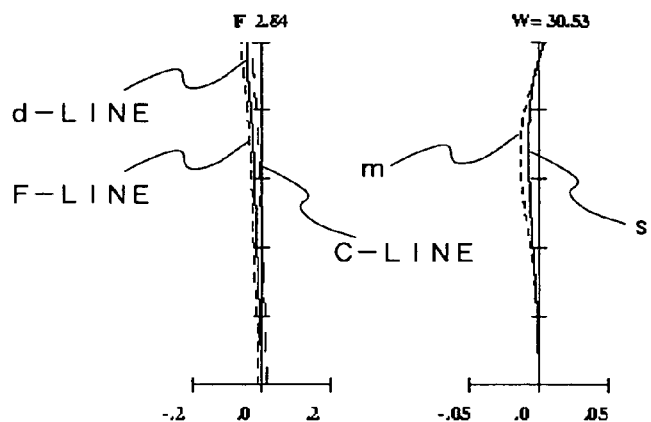
FIG. 18B
FIG. 18C
FIG. 18D
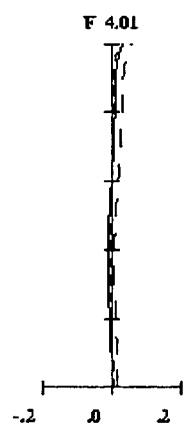
FIG. 18E
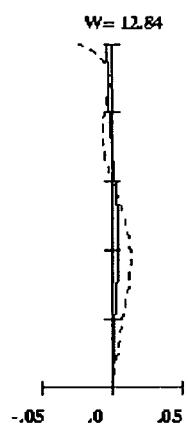
FIG. 18F
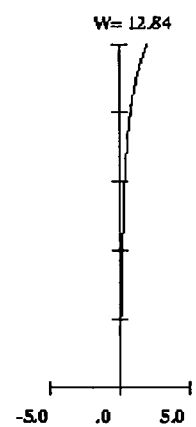
FIG. 18G
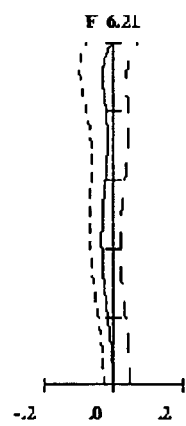
FIG. 18H
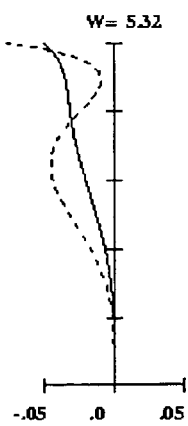
FIG. 18I
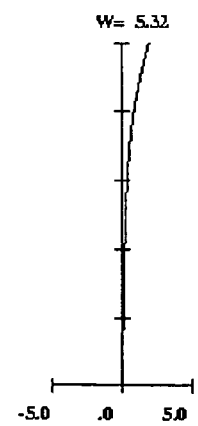
SPHERICAL ABERRATION (mm)   ASTIGMATISM (mm)   DISTORTION (%)

FIG. 19A  FIG. 19B  FIG. 19C
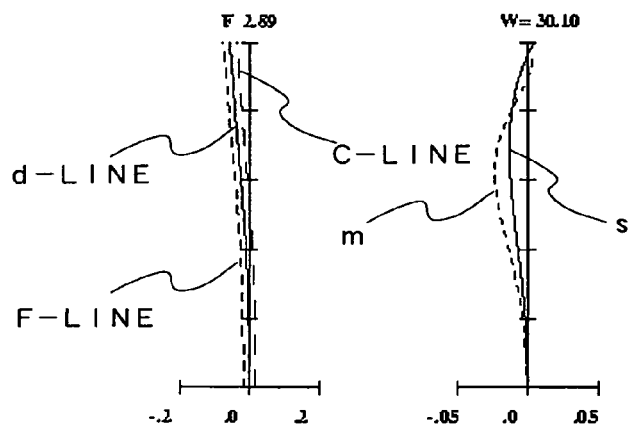
FIG. 19D  FIG. 19E  FIG. 19F
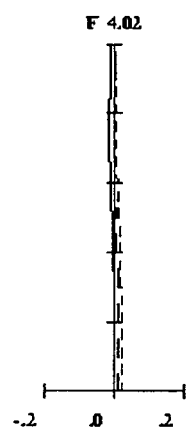 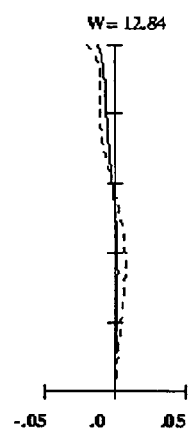 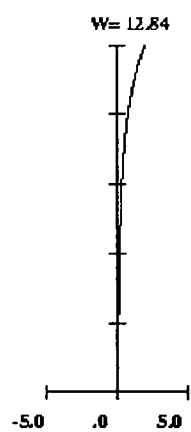
FIG. 19G  FIG. 19H  FIG. 19I
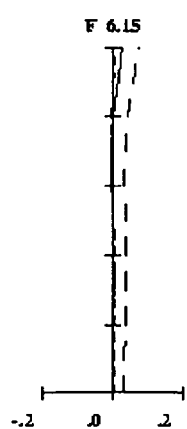 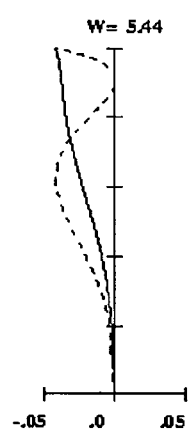 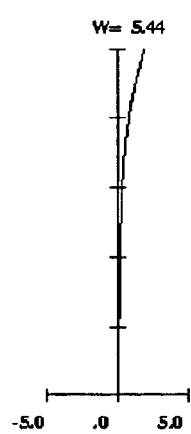
SPHERICAL ABERRATION (mm)  ASTIGMATISM (mm)  DISTORTION (%)

FIG. 20A
FIG. 20B
FIG. 20C
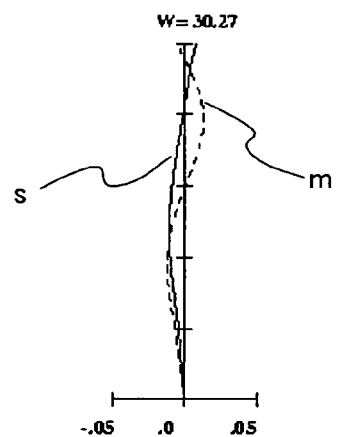
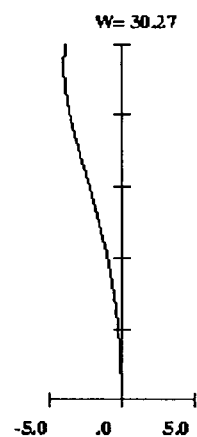
FIG. 20D
FIG. 20E
FIG. 20F
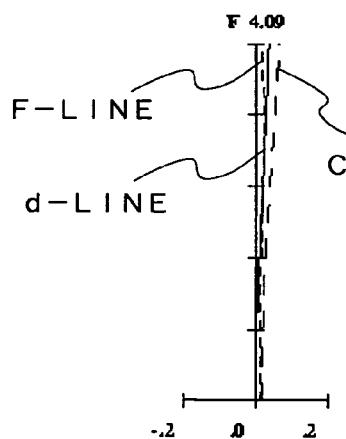
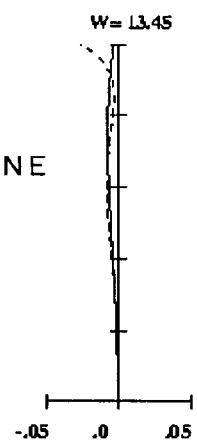
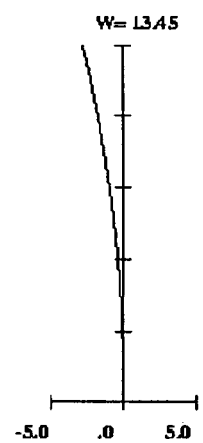
FIG. 20G
FIG. 20H
FIG. 20I
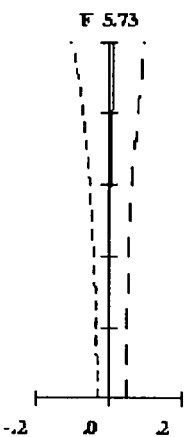
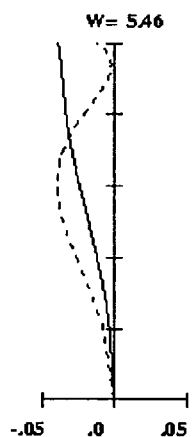
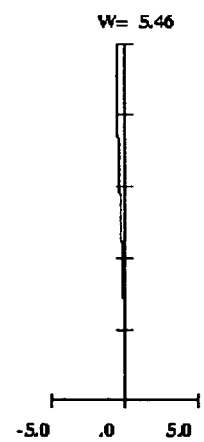
SPHERICAL ABERRATION (mm)        ASTIGMATISM (mm)        DISTORTION (%)

FIG. 21A
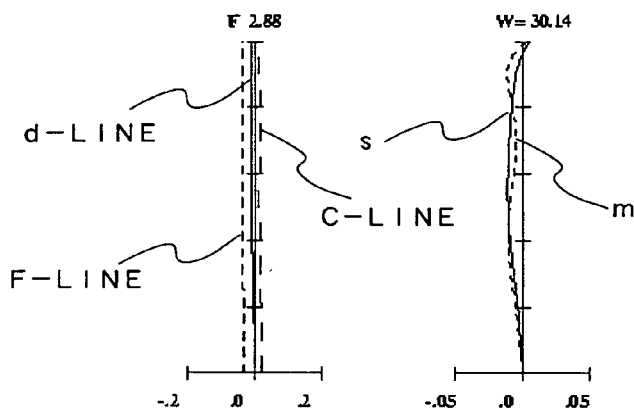
FIG. 21B
FIG. 21C
FIG. 21D
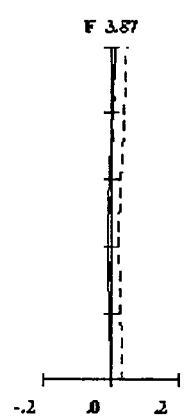
FIG. 21E
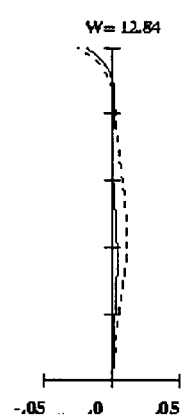
FIG. 21F
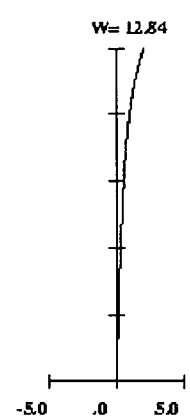
FIG. 21G
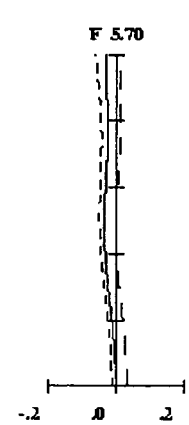
FIG. 21H
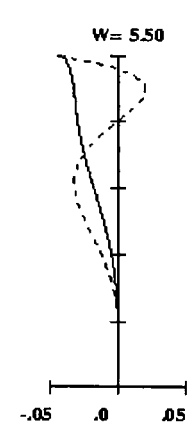
FIG. 21I
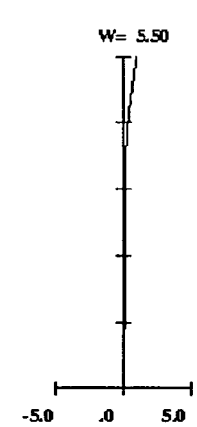
SPHERICAL ABERRATION (mm)　　ASTIGMATISM (mm)　　DISTORTION (%)

SPHERICAL ABERRATION (mm)　　ASTIGMATISM (mm)　　DISTORTION (%)

SPHERICAL ABERRATION (mm)　　ASTIGMATISM (mm)　　DISTORTION (%)

SPHERICAL ABERRATION (mm)   ASTIGMATISM (mm)   DISTORTION (%)

ZOOM LENS SYSTEM AND LENS BARREL HAVING THE SAME

CROSS-REFERENCE TO RELATED APPLICATION

This application is based on applications No. 2005-178153 filed in Japan on Jun. 17, 2005 and No. 2006-142596 filed in Japan on May 23, 2006, the content of which is hereby incorporated by reference.

BACKGROUND

1. Technical Field

The present invention relates to a zoom lens system and a lens barrel having the same. In particular, the present invention relates to a small and high-image quality zoom lens system which is suitable for a digital still camera, a digital video camera or the like (simply also referred to as a camera, hereinafter), and a lens barrel for holding the zoom lens system.

2. Description of the Background Art

With recent progress in the development of solid-state image sensors such as a CCD (Charge Coupled Device) and a CMOS (Complementary Metal-Oxide Semiconductor) having a high pixel, digital still cameras and digital video cameras are rapidly spreading that employ an imaging device including an imaging optical system of high optical performance corresponding to a solid-state image sensor of high pixel.

Among these, especially in digital still cameras, constructions have recently been proposed in which a thin camera body is employed in order to achieve satisfactory accommodation property or portability to which the highest priority is imparted. In order to realize such digital still cameras having a thin camera body, an importance is present in taking into consideration the arrangement construction of the imaging device when not in use, that has a relatively large volume among the components of the digital still camera.

For example, Japanese Laid-Open Patent Publication No. 2003-315861 discloses a lens barrel in which in a retracted state, part of optical elements constituting an imaging optical system (typically, a lens unit in a zoom lens system) is escaped to a position different from that in an imaging state. More specifically, in the lens barrel disclosed in Japanese Laid-Open Patent Publication No. 2003-315861, in an imaging optical system composed of three lens units consisting of a first lens unit through a third lens unit, a second lens unit is escaped in a direction perpendicular to the optical axis of the first lens unit and the third lens unit, while these lens units are escaped to the image side, so that retraction is performed. As a result, the overall thickness is reduced.

Further, Japanese Laid-Open Patent Publication No. 2003-202500 discloses a construction in which in an imaging device provided with a zoom lens system, a right-angle prism provided with an internal reflecting surface for bending a light beam by 90° is arranged inside a lens unit located on the most object side. In the imaging device disclosed in Japanese Laid-Open Patent Publication No. 2003-202500, since the object light is bent into a plane perpendicular to the optical axis of the incident lens unit, the thickness of the imaging device is determined by the right-angle prism and the lens elements located on the object side relative to the right-angle prism. This reduces the thickness.

Further, Japanese Laid-Open Patent Publication No. 2004-102089 discloses a construction in which in an imaging device provided with a zoom lens system composed of four units having a construction of positive, negative, positive and positive, a right-angle prism provided with an internal reflecting surface for bending a light beam by 90° is arranged inside a second lens unit having negative optical power. In the imaging device disclosed in Japanese Laid-Open Patent Publication No. 2004-102089, the right-angle prism can be arranged inside the lens unit located on the image side relative to the first lens unit having positive optical power. This allows the right-angle prism to be constructed compactly.

Further, Japanese Laid-Open Patent Publication No. 2004-118101 discloses a zoom lens system having a retraction construction in which the lens elements are driven backward to the image side in an accommodated state so that the overall length is reduced. In the zoom lens system disclosed in Japanese Laid-Open Patent Publication No. 2004-118101, in an accommodated state, an optical filter located on the most image side in the imaging optical system is escaped in a direction perpendicular to the optical axis, so that the overall length is reduced in a retracted state.

Nevertheless, the lens barrel disclosed in Japanese Laid-Open Patent Publication No. 2003-315861 has a problem that a considerably complicated mechanism is necessary for escaping the optical element and that extremely high precision is required in machining and assembling of the components of this mechanism. Further, in the lens barrel disclosed in Japanese Laid-Open Patent Publication No. 2003-315861, since a specific optical element is solely escaped, the thickness of the imaging device is determined by the optical elements not escaped so that the thickness reduction has been limited. Furthermore, in a zoom lens system having a large magnification variation ratio exceeding 3×, four or more lens units are used in general (a multi-unit zoom lens system). Nevertheless, when the lens barrel disclosed in Japanese Laid-Open Patent Publication No. 2003-315861 is applied to such a multi-unit zoom lens system, a problem arises that the mechanism becomes complicated whereas the merit of thickness reduction became small.

Further, in the zoom lens system disclosed in Japanese Laid-Open Patent Publication No. 2003-202500, since the reflecting surface is arranged in the lens unit located on the most object side, a problem arises that a large reflecting surface is necessary. In the zoom lens system disclosed in Japanese Laid-Open Patent Publication No. 2003-202500, the thickness of the imaging device is determined by the size of the reflecting surface. Thus, it is undesirable that the reflecting surface becomes large. Further, a bright imaging optical system having a small F-number is difficult to be designed without enlarging the reflecting surface. The situation is similarly undesirable.

Further, in the zoom lens system disclosed in Japanese Laid-Open Patent Publication No. 2004-102089, the distance from the lens element located on the most object side to the reflecting surface cannot largely differ from the distance from the reflecting surface to the image sensor. This places a limit on the overall thickness reduction.

Further, in the zoom lens system disclosed in Japanese Laid-Open Patent Publication No. 2004-118101, size reduction is achieved merely for the amount corresponding to the thickness of the optical filter. This thickness reduction can be insufficient.

SUMMARY

An object of the present invention is to provide: a zoom lens system having a magnification variation ratio of 5× or greater and a high resolution; and a compact lens barrel that has a short overall length in an accommodated state and that holds the zoom lens system.

The novel concepts disclosed herein were achieved in order to solve the foregoing problems in the conventional art, and herein is disclosed:

a zoom lens system, in order from the object side to the image side, comprising:

a first lens unit having positive optical power;

a second lens unit that includes a reflective optical element having a reflecting surface for bending a light ray from an object and that has negative optical power; and a subsequent lens unit including at least one lens unit having positive optical power, wherein the following condition (1) is satisfied:

$$-5.70 < f_1/f_2 < -2.00 \quad (1)$$

(here, $Z=f_T/f_W>5.0$)

where, $f_1$ is a composite focal length of the first lens unit,
$f_2$ is a composite focal length of the second lens unit,
$f_W$ is a focal length of the entire zoom lens system at a wide-angle limit,
$f_T$ is a focal length of the entire zoom lens system at a telephoto limit, and
Z is a magnification variation ratio.

The novel concepts disclosed herein were achieved in order to solve the foregoing problems in the conventional art, and herein is disclosed:

a lens barrel for holding an imaging optical system that forms an optical image of an object, wherein the imaging optical system is a zoom lens system that, in order from the object side to the image side, comprises:

a first lens unit having positive optical power;

a second lens unit that includes a reflective optical element having a reflecting surface for bending a light ray from an object and that has negative optical power; and a subsequent lens unit including at least one lens unit having positive optical power, and that satisfies the following condition (1):

$$-5.70 < f_1/f_2 < -2.00 \quad (1)$$

(here, $Z=f_T/f_W>5.0$)

in which,
$f_1$ is the composite focal length of the first lens unit,
$f_2$ is the composite focal length of the second lens unit,
$f_W$ is the focal length of the entire zoom lens system at a wide-angle limit,
$f_T$ is the focal length of the entire zoom lens system at a telephoto limit, and
Z is the magnification variation ratio, and wherein
in an accommodated state, the reflective optical element is escaped to a position different from a position located in an imaging state.

The novel concepts disclosed herein were achieved in order to solve the foregoing problems in the conventional art, and herein is disclosed:

a lens barrel for holding an imaging optical system that forms an optical image of an object, wherein the imaging optical system is a zoom lens system that, in order from the object side to the image side, comprises:

a first lens unit having positive optical power;

a second lens unit that includes a reflective optical element having a reflecting surface for bending a light ray from an object and that has negative optical power; and a subsequent lens unit including at least one lens unit having positive optical power, and that satisfies the following condition (1):

$$-5.70 < f_1/f_2 < -2.00 \quad (1)$$

(here, $Z=f_T/f_W>5.0$)

in which,
$f_1$ is the composite focal length of the first lens unit,
$f_2$ is the composite focal length of the second lens unit,
$f_W$ is the focal length of the entire zoom lens system at a wide-angle limit,
$f_T$ is the focal length of the entire zoom lens system at a telephoto limit, and
Z is the magnification variation ratio, and wherein
in the accommodated state, the reflective optical element is fixed at the same position as located in the imaging state.

The present invention provides a zoom lens system having a magnification variation ratio of 5× or greater and a high resolution, and a compact lens barrel that has a short overall length in an accommodated state and that holds the zoom lens system. Thus, when this lens barrel is employed, a thin imaging device and a thin camera are realized that have a magnification variation ratio of 5× or greater and a high resolution.

BRIEF DESCRIPTION OF THE DRAWINGS

This and other objects and features of this invention will become clear from the following description, taken in conjunction with the preferred embodiments with reference to the accompanied drawings in which:

FIGS. 18A to 18I are longitudinal aberration diagrams at a wide-angle limit, a middle position and a telephoto limit in a zoom lens system according to Example 1;

FIGS. 19A to 19I are longitudinal aberration diagrams at a wide-angle limit, a middle position and a telephoto limit in a zoom lens system according to Example 2;

FIGS. 20A to 20I are longitudinal aberration diagrams at a wide-angle limit, a middle position and a telephoto limit in a zoom lens system according to Example 3;

FIGS. 21A to 21I are longitudinal aberration diagrams at a wide-angle limit, a middle position and a telephoto limit in a zoom lens system according to Example 4;

DESCRIPTION OF THE PREFERRED EMBODIMENTS

The present invention is described below in further detail with reference to embodiments.

(Embodiment 1)

Figure 1A:
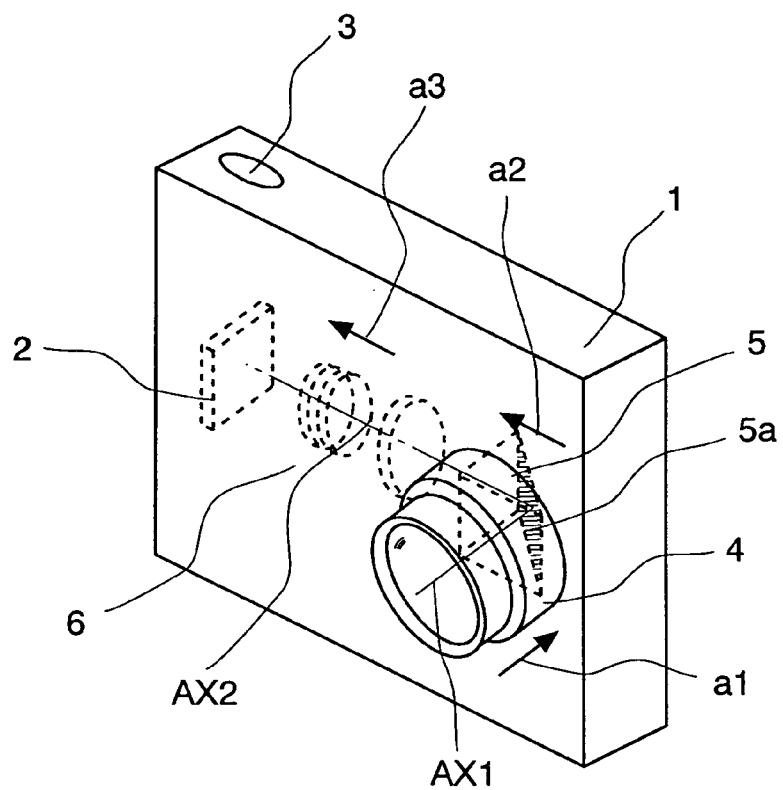
FIG. 1A is a perspective view showing a diagrammatic construction in an imaging state of a camera employing an imaging device according to Embodiment 1.
Figure 1B:
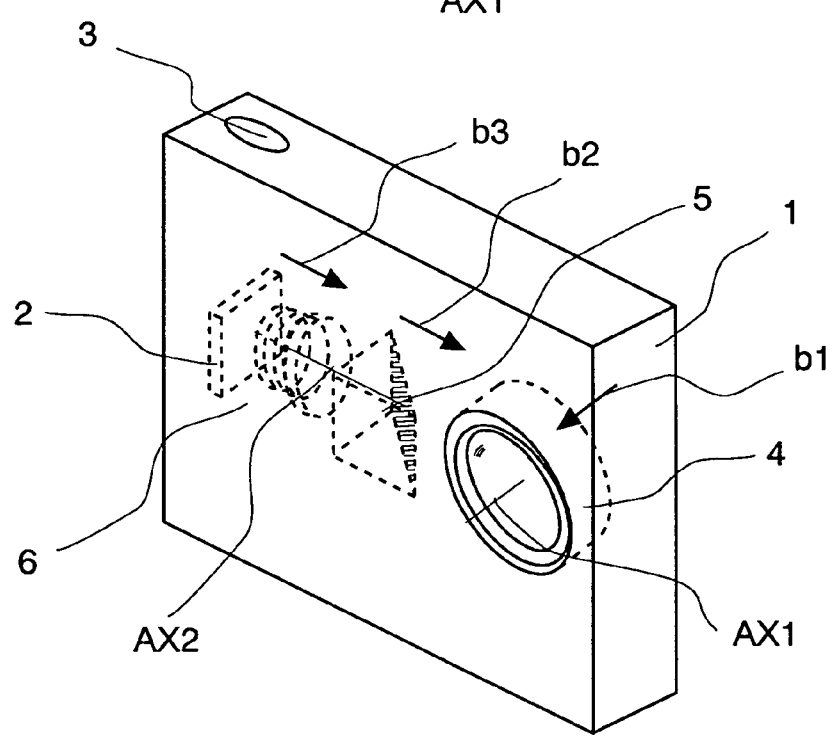
FIG. 1B is a perspective view showing a diagrammatic construction in an accommodated state of a camera employing an imaging device according to Embodiment 1.

FIG. 1A is a perspective view showing a diagrammatic construction in an imaging state of a camera (digital still camera) employing an imaging device according to Embodiment 1. FIG. 1B is a perspective view showing a diagrammatic construction in an accommodated state of the camera. Here, FIGS. 1A and 1B are drawings schematically showing an imaging device according to Embodiment 1. Thus, the scale and the detailed layout can differ from actual ones.

As shown in FIGS. 1A and 1B, the camera employing an imaging device according to the present Embodiment 1 comprises: a camera body 1; an image sensor 2; a shutter button 3 arranged at an edge of the upper surface of the camera body 1; an object side lens unit 4; a reflective optical element 5; and an image side lens unit 6. Then, the object side lens unit 4, the reflective optical element 5 and the image side lens unit 6 constitute an imaging optical system. Then, an optical image of an object is formed in the light acceptance surface of the image sensor 2 by the imaging optical system. Here, the imaging optical system is held by a lens barrel described later. Further, the imaging optical system, the lens barrel that holds the imaging optical system and the image sensor 2 constitute the imaging device. As such, the camera of Embodiment 1 comprises: the imaging device composed of the imaging optical system, the lens barrel and the image sensor 2; and a camera body 1 for accommodating the imaging device. Here, the image sensor 2 is an imaging sensor such as a CCD or a CMOS.

In the imaging state shown in FIG. 1A, the image sensor 2 generates and outputs an electric image signal on the basis of the optical image formed on the light acceptance surface of the image sensor 2 by the imaging optical system. The shutter button 3 determines the acquisition timing for an image signal of the image sensor 2 when operated by an operator. The object side lens unit 4 is held inside a lens holding barrel (a first lens unit holding multi-stage barrel described later) which can be expanded and contracted along the direction of the optical axis AX1. The reflective optical element 5 is provided with a reflecting surface 5a for bending by approximately 90° the optical axis AX1 of the object side lens unit 4 (an axial principal ray from the object). The reflecting surface 5a deflects the object light exiting from the object side lens unit 4 toward the image side lens unit 6. The image side lens unit 6 is arranged on the optical axis AX2, and thereby transmits the object light deflected by the reflecting surface 5a to the image sensor 2.

In an accommodated state shown in FIG. 1B, the object side lens unit 4 is retracted and accommodated into the camera body 1. The reflective optical element 5 arranged on the image side of the object side lens unit 4 in the imaging state is escaped to the image sensor 2 side along the optical axis AX2. The image side lens unit 6 is also escaped to the image sensor 2 side along the optical axis AX2. As such, in the accommodated state, the imaging optical system composed of the object side lens unit 4, the reflective optical element 5 and the image side lens unit 6 is completely accommodated inside the camera body 1.

In transition from the imaging state shown in FIG. 1A to the accommodated state shown in FIG. 1B, the image side lens unit 6 first moves toward the image sensor 2 along the optical axis AX2 (arrow a3 in FIG. 1A). Then, the reflective optical element 5 moves toward the image sensor 2 along the optical axis AX2 (arrow a2 in FIG. 1A). Then, as a result of movement of the image side lens unit 6 and the reflective optical element 5, a space is formed on the image side of the object side lens unit 4. Finally, the lens holding barrel that holds the object side lens unit 4 is retracted into the space along the optical axis AX1 (arrow a1 in FIG. 1A), so that the transition to the accommodated state is completed.

On the contrary, in transition from the accommodated state shown in FIG. 1B to the imaging state shown in FIG. 1A, the lens holding barrel that holds the object side lens unit 4 is first drawn out along the optical axis AX1 (arrow b1 in FIG. 1B). Then, as a result of draw-out of the lens holding barrel that holds the object side lens unit 4, a space is formed on the image side of the object side lens unit 4. Then, the reflective optical element 5 moves into the space along the optical axis AX2 (arrow b2 in FIG. 1B). Finally, the image side lens unit 6 moves toward the reflective optical element 5 along the optical axis AX2 (arrow b3 in FIG. 1B), so that the transition to the imaging state is completed.

Figure 2A:
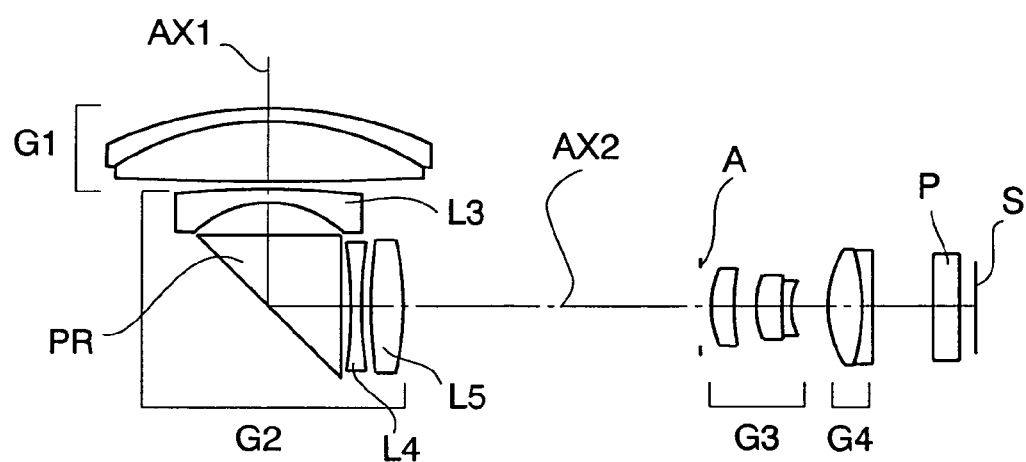
FIG. 2A is a plan view showing a lens arrangement of an imaging optical system in an imaging state at a wide-angle limit in Embodiment 1.
Figure 2B:
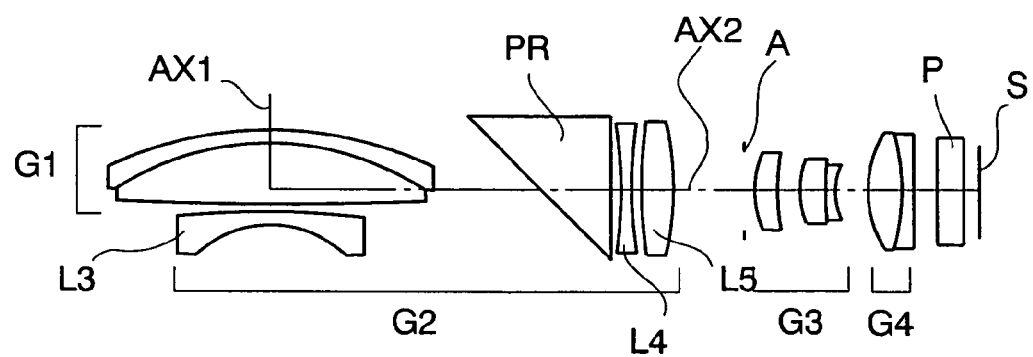
FIG. 2B is a plan view showing a lens arrangement of an imaging optical system in an accommodated state in Embodiment 1.

FIG. 2A is a plan view showing a lens arrangement of an imaging optical system in an imaging state at a wide-angle limit in Embodiment 1. FIG. 2B is a plan view showing a lens arrangement of an imaging optical system in an accommodated state.

As shown in FIGS. 2A and 2B, the imaging optical system according to the present Embodiment 1 is a zoom lens system. The zoom lens system, in order from the object side to the image side, comprises: a first lens unit G1 having positive optical power; a second lens unit G2 having negative optical power; and subsequently a diaphragm A, a third lens unit G3 and a fourth lens unit G4. Here, a straight line drawn on the right most side in the figure indicates the position of an image surface S. On the object side of the image surface S, a plane parallel plate P is provided that is equivalent to an optical low-pass filter, a face plate of an image sensor or the like. Further, a prism PR serving as a reflective optical element is arranged inside the second lens unit G2.

In the zoom lens system of Embodiment 1, in the accommodated state shown in FIG. 2B, among the second lens unit G2 components, a negative meniscus third lens element L3 located on the most object side is accommodated in a manner separated from the prism PR serving as a reflective optical element and the subsequent fourth and fifth lens elements L4 and L5. That is, the negative meniscus third lens element L3 is held separately from the prism PR and the subsequent fourth and fifth lens elements L4 and L5, and hence is not follow the escape along the optical axis AX2 performed by a lens block consisting of the prism PR and the subsequent fourth and fifth lens elements L4 and L5. Thus, the negative meniscus third lens element L3 is retracted and accommodated along the optical axis AX1 together with the first lens unit G1.

Figure 3A:
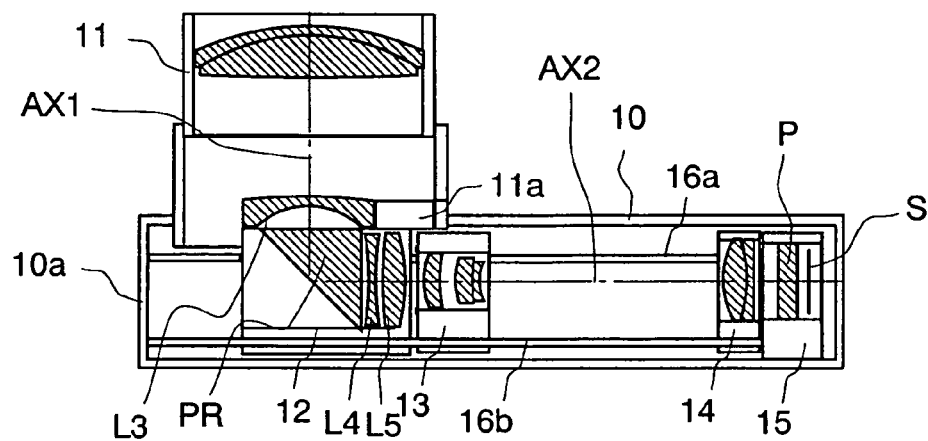
FIG. 3A is a horizontal sectional view showing an arrangement of a lens barrel in an imaging state at a telephoto limit of an imaging device according to Embodiment 1.
Figure 3B:
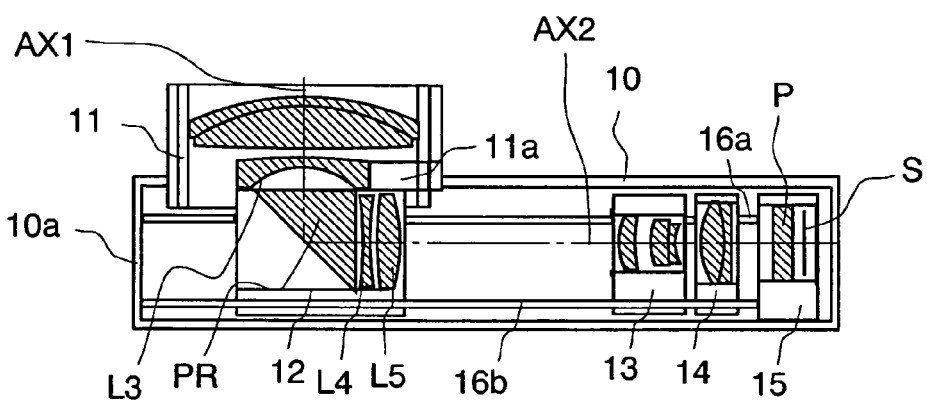
FIG. 3B is a horizontal sectional view showing an arrangement of a lens barrel in an imaging state at a wide-angle limit of an imaging device according to Embodiment 1.
Figure 3C:
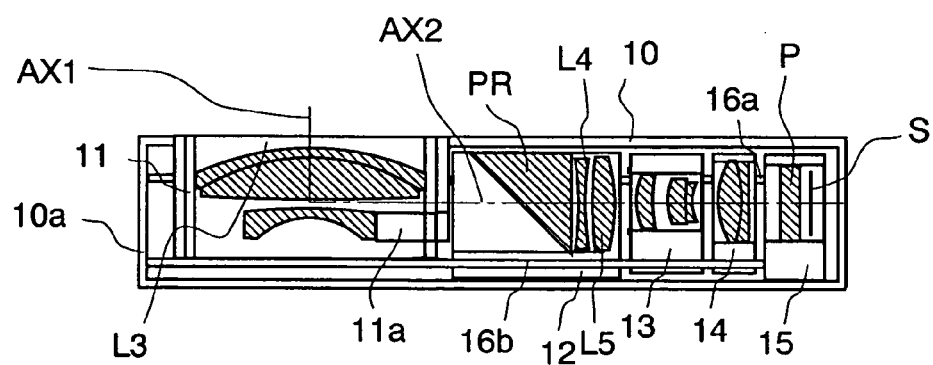
FIG. 3C is a horizontal sectional view showing an arrangement of a lens barrel in an accommodated state of an imaging device according to Embodiment 1.

FIG. 3A is a horizontal sectional view showing an arrangement of a lens barrel in the imaging state at a telephoto limit of an imaging device according to Embodiment 1. FIG. 3B is a horizontal sectional view showing an arrangement of the lens barrel in the imaging state at a wide-angle limit of the imaging device. FIG. 3C is a horizontal sectional view showing an arrangement of the lens barrel in the accommodated state of the imaging device.

As shown in FIGS. 3A, 3B and 3C, the lens barrel of the imaging device according to Embodiment 1 comprises a main barrel 10, a first lens unit holding multi-stage barrel 11, a second lens unit holding barrel 12, a third lens unit holding barrel 13, a fourth lens unit holding barrel 14, an image sensor holding barrel 15 and guide shafts 16a and 16b.

The main barrel 10 is a body capable of accommodating the entire component members of the imaging device in the accommodated state (FIG. 3C). In the imaging state shown in FIGS. 3A and 3B, the second lens unit holding barrel 12, the third lens unit holding barrel 13, the fourth lens unit holding barrel 14, the image sensor holding barrel 15 and the guide shafts 16a and 16b are located in the main barrel 10.

The first lens unit holding multi-stage barrel 11 is an expandable two-stage lens barrel. Draw-out and barrel escape of the first lens unit along the optical axis AX1 are driven by a drive motor and a drive mechanism which are not shown. In the first lens unit holding multi-stage barrel 11, the first lens unit is held in a barrel having the smallest inner diameter. Further, a barrel having the largest inner diameter in the first lens unit holding multi-stage barrel 11 is provided with a holding section 11a for holding the negative meniscus third lens element L3 located on the most object side in the second lens unit.

The second lens unit holding barrel 12 holds the prism PR and the subsequent fourth and fifth lens elements L4 and L5 among the second lens unit components. Further, the third lens unit holding barrel 13 and the fourth lens unit holding barrel 14 hold the third lens unit and the fourth lens unit, respectively. Further, the image sensor holding barrel 15 holds the plane parallel plate P and the image sensor (image surface S).

The second lens unit holding barrel 12, the third lens unit holding barrel 13 and the fourth lens unit holding barrel 14 are guided on the two guide shafts 16a and 16b arranged in parallel to the optical axis AX2, and held in a manner movable along the optical axis AX2. Further, the second lens unit holding barrel 12, the third lens unit holding barrel 13 and the fourth lens unit holding barrel 14 are driven along the optical axis AX2 by a drive motor and a drive mechanism which are not shown. Here, in each of the guide shafts 16a and 16b, one end is fixed to the image sensor holding barrel 15, while the other end is fixed to the top end 10a of the main barrel 10.

In the imaging state at a telephoto limit shown in FIG. 3A, the first lens unit holding multi-stage barrel 11 is drawn out along the optical axis AX1 to the maximum, while the interval between the first lens unit and the second lens unit is at maximum. Further, the components from the second lens unit holding barrel 12 to the image sensor holding barrel 15 are arranged respectively at predetermined positions on the optical axis AX2 at the telephoto limit.

In transition from the imaging state at a telephoto limit shown in FIG. 3A to the imaging state at a wide-angle limit shown in FIG. 3B, the first lens unit holding multi-stage barrel 11 is shortened along the optical axis AX1 to the minimum length, and then stops at a position where the interval between the first lens unit and the second lens unit becomes minimum. At that time, during the shortening of the first lens unit holding multi-stage barrel 11, the third lens element L3 held in the holding section 11a of the first lens unit holding multi-stage barrel 11 is fixed such that the interval with the prism PR should not vary. Further, the third and fourth lens unit holding barrels 13 and 14 move along the optical axis AX2 in a manner guided by the guide shafts 16a and 16b, and then stop respectively at predetermined positions on the optical axis AX2 at the wide-angle limit. Here, during this time, the second lens unit holding barrel 12 and the image sensor holding barrel 15 are fixed.

In transition from the imaging state at the wide-angle limit shown in FIG. 3B to the accommodated state shown in FIG. 3C, the third and fourth lens unit holding barrels 13 and 14 move along the optical axis AX2 in a manner guided by the guide shafts 16a and 16b, and then stop respectively at predetermined positions such as to form a space for accommodating the second lens unit holding barrel 12. During this time, the image sensor holding barrel 15 is fixed. Further, the second lens unit holding barrel 12 moves into the space along the optical axis AX2, so that the prism PR and the subsequent fourth and fifth lens elements L4 and L5 among the second lens unit components are escaped. After that, the first lens unit holding multi-stage barrel 11 is retracted along the optical axis AX1 with maintaining the minimum length, thereby accommodated into the main barrel 10, and then stopped.

As described above, according to the construction of the lens barrel of Embodiment 1, in the accommodated state, the reflective optical element (prism PR) is escaped to an escape position different from a position located in the imaging state. Thus, the air space generated in the imaging state can be used effectively, so that an imaging optical system having a large air space such a zoom lens system having a large magnification can be accommodated in a manner compact and thin in the optical axis direction of the axial light beam from the object.

Further, according to the construction of the lens barrel of Embodiment 1, the reflective optical element has a reflecting surface for bending by approximately 90° the axial principal ray from the object. This permits a construction that in the imaging state, the imaging optical system becomes thin in the optical axis direction of the axial light beam from the object.

Further, according to the construction of the lens barrel of Embodiment 1, the imaging optical system comprises: an object side lens unit located on the object side relative to the reflective optical element; and an image side lens unit located on the image side relative to the reflective optical element. Thus, even a complicated imaging optical system having a large amount of movement of the lens unit, such a zoom lens system having a high magnification, can be easily constructed in a manner compact and thin in the optical axis direction of the axial light beam from the object.

Further, according to the construction of the lens barrel of Embodiment 1, the reflective optical element is escaped in a direction perpendicular to the not-reflected axial principal ray from the object. This permits a construction that in the imaging state, the imaging optical system becomes thin in the optical axis direction of the axial light beam from the object. In particular, according to the construction of the lens barrel of Embodiment 1, the reflective optical element is escaped to the image side of the imaging optical system. Thus, the air space generated in the imaging state can be used as an accommodation space for the lens elements. This realizes a compact accommodated state in the imaging optical system.

Further, according to the construction of the lens barrel of Embodiment 1, the imaging optical system, in order from the object side to the image side, comprises: a first lens unit having positive optical power; a second lens unit having negative optical power; and at least one subsequent lens unit having positive optical power. Further, a reflective optical element is arranged inside the second lens unit. Thus, the size can be reduced in the reflecting surface of the reflective optical element. In particular, the imaging optical system can be constructed in a manner thin in the optical axis direction of the axial light beam from the object. Further, the size can be reduced in the precise reflective optical element. This reduces the cost of the lens barrel.

Further, according to the construction of the lens barrel of Embodiment 1, the second lens unit, in order from the object side to the image side, includes: a negative meniscus third lens element L3 whose image side surface has more intense optical power; a reflective optical element; and at least one subsequent lens element. This negative meniscus third lens element L3 reduces the incident angle at the time that the light beam from the object is incident on the reflecting surface.

In particular, according to the construction of the lens barrel of Embodiment 1, in the accommodated state, the negative meniscus third lens element L3 is not escaped together with the reflective optical element. This avoids the necessity that the negative meniscus third lens element L3 which has intense optical power and hence high decentration sensitivity is moved from the optical axis. Thus, in the transition from the accommodated state to the imaging state, restoration is achieved in a state that the relative spatial arrangement is maintained between the first lens unit and the negative meniscus third lens element L3.

Here, in general, the zoom lens system according to Embodiment 1 is accommodated into the lens barrel in the state shown in FIG. 3C. In this case, the zoom lens system can be constructed in an especially compact and thin manner in the optical axis direction of the axial light ray from the object. Alternatively, the accommodated state may be adopted such that transition from the state of telephoto limit shown in FIG. 3A to the state of wide-angle limit shown in FIG. 3B has been completed so that the first lens unit holding multi-stage barrel is shortened to the minimum length and then stops at a position where the interval between the first lens unit and the second lens unit becomes minimum. In this case, for example, the time from power start-up of the imaging device to shooting can be shortened.

Figure 4A:
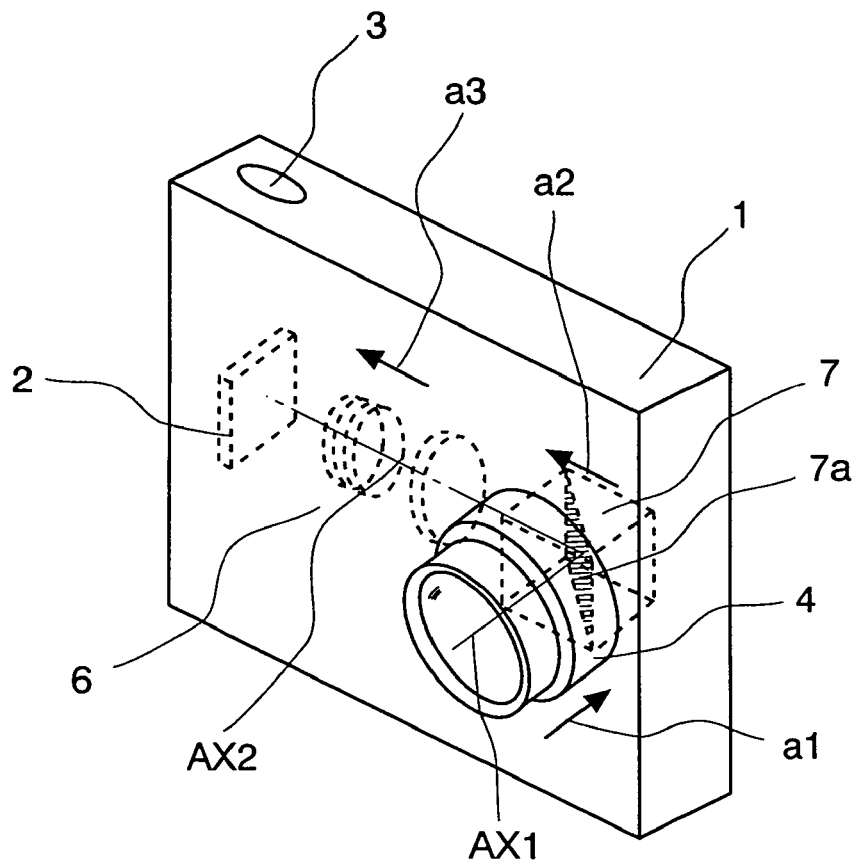
FIG. 4A is a perspective view showing a diagrammatic construction in an imaging state of a camera employing another imaging device according to Embodiment 1.
Figure 4B:
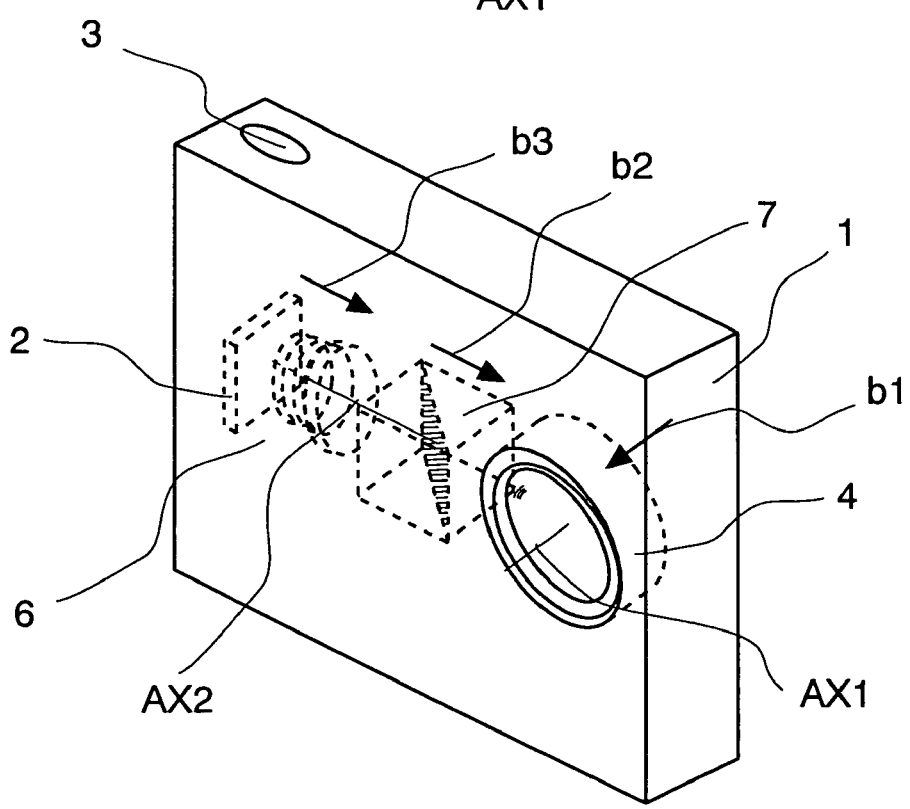
FIG. 4B is a perspective view showing a diagrammatic construction in an accommodated state of a camera employing another imaging device according to Embodiment 1.

FIG. 4A is a perspective view showing a diagrammatic construction in an imaging state of a camera (digital still camera) employing another imaging device according to Embodiment 1. FIG. 4B is a perspective view showing a diagrammatic construction in an accommodated state of the camera. Here, the same components as those of FIGS. 1A and 1B are designated by the same numerals, and hence their description is omitted.

As shown in FIGS. 4A and 4B, in this imaging device, in contrast to the imaging device shown in FIGS. 1A and 1B, a cube-shaped reflective optical element 7 is employed. As such, the embodiment of the reflective optical element having a reflecting surface is not limited to a specific one. That is, the reflective optical element may be of any kind, like a mirror such as a parallel-plate shaped internal reflection mirror or a parallel-plate shaped surface reflection mirror and a prism such as a surface reflection prism. Further, as to the prism described above, a prism having optical power or a prism any one of whose incident and exit surfaces is plane is employed preferably. Further, the reflecting surface of the reflective optical element may be fabricated by any one of known methods including: vapor deposition of metal such as aluminum; and forming of a dielectric multilayer film. Furthermore, the reflecting surface need not have a reflectance of 100%. Thus, the reflectance may be appropriately adjusted, for example, in order that light for photometry or for an optical finder system should be extracted from the object light or alternatively that auto-focusing assisting light or the like should be projected through the reflecting surface.

Here, also for the lens barrel employed in the camera shown in FIGS. 4A and 4B, similarly to the above-mentioned case, the accommodated state may be adopted such that the transition has been completed from the state of telephoto limit to the state of wide-angle limit so that the first lens unit holding multi-stage barrel is shortened to the minimum length and then stops at a position where the interval between the first lens unit and the second lens unit becomes minimum.

(Embodiment 2)

Figure 5A:
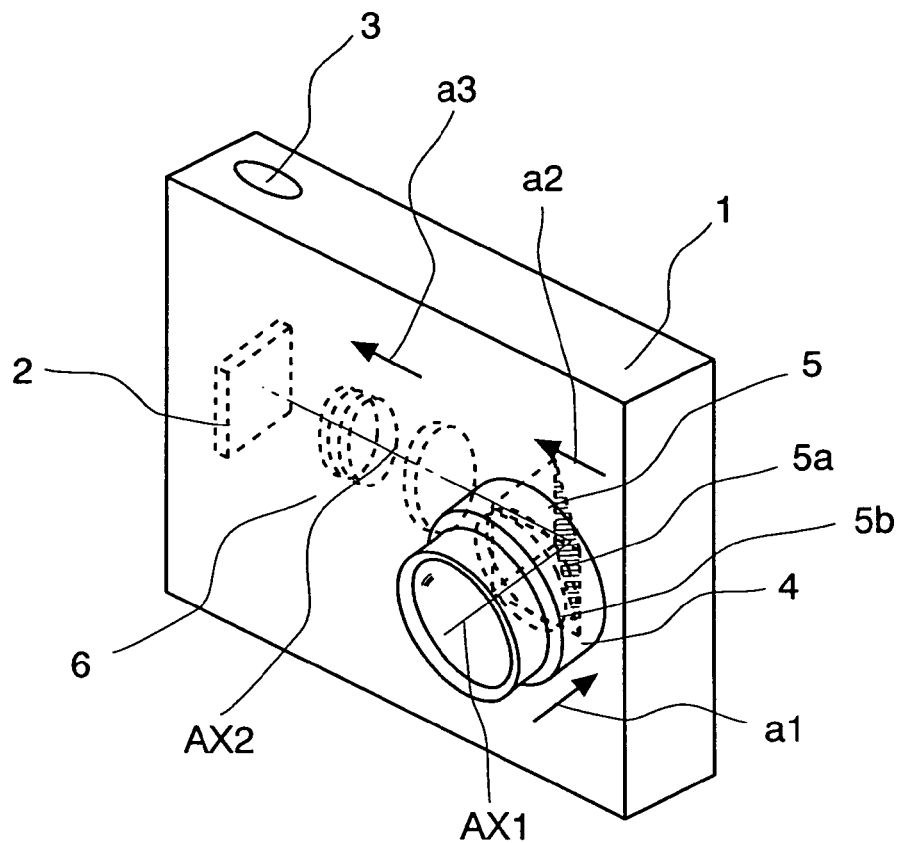
FIG. 5A is a perspective view showing a diagrammatic construction in an imaging state of a camera employing an imaging device according to Embodiment 2.
Figure 5B:
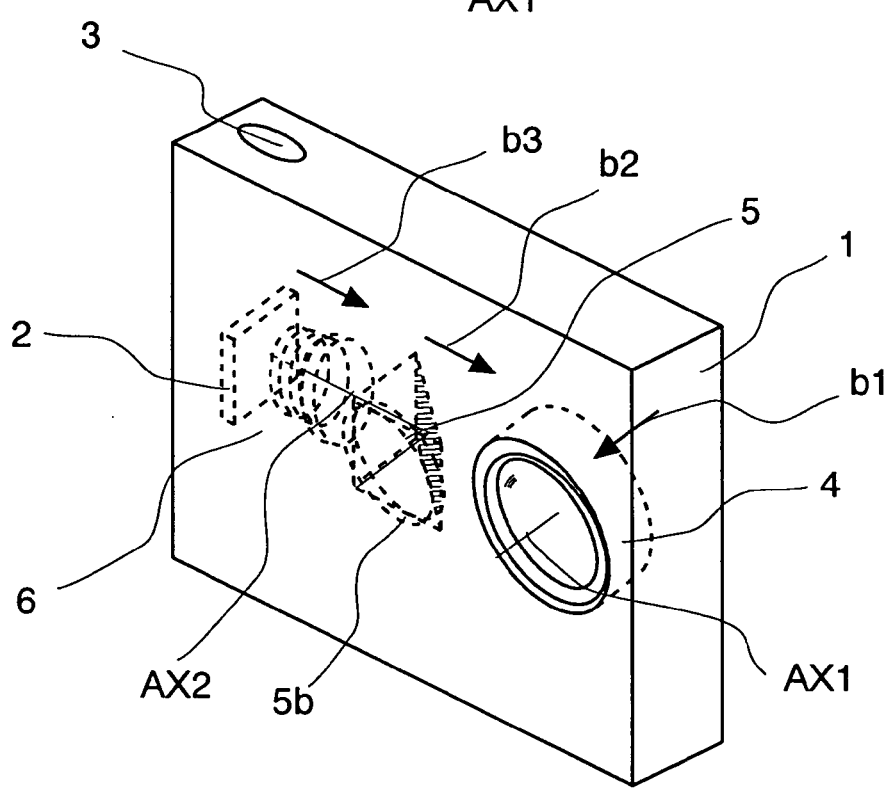
FIG. 5B is a perspective view showing a diagrammatic construction in an accommodated state of a camera employing an imaging device according to Embodiment 2.

FIG. 5A is a perspective view showing a diagrammatic construction in an imaging state of a camera (digital still camera) employing an imaging device according to Embodiment 2. FIG. 5B is a perspective view showing a diagrammatic construction in an accommodated state of the camera. Here, the same components as those of FIGS. 1A and 1B of Embodiment 1 described above are designated by the same numerals, and hence their description is omitted.

As shown in FIGS. 5A and 5B, the imaging device according to the present Embodiment 2 is different from the imaging device according to Embodiment 1 in the point that the block escaped in the accommodated state includes a lens element 5b arranged on the object side relative to the reflective optical element 5.

In transition from the imaging state shown in FIG. 5A to the accommodated state shown in FIG. 5B, the image side lens unit 6 first moves toward the image sensor 2 along the optical axis AX2 (arrow a3 in FIG. 5A). Then, the reflective optical element 5 and the lens element 5b move toward the image sensor 2 along the optical axis AX2 (arrow a2 in FIG. 5A). Then, as a result of movement of the image side lens unit 6, the reflective optical element 5 and the lens element 5b, a space is formed on the image side of the object side lens unit 4. Finally, the lens holding barrel that holds the object side lens unit 4 is retracted into the space along the optical axis AX1 (arrow a1 in FIG. 5A), so that the transition to the accommodated state is completed.

On the contrary, in transition from the accommodated state shown in FIG. 5B to the imaging state shown in FIG. 5A, the lens holding barrel that holds the object side lens unit 4 is first drawn out along the optical axis AX1 (arrow b1 in FIG. 5B). Then, as a result of draw-out of the lens holding barrel that holds the object side lens unit 4, a space is formed on the image side of the object side lens unit 4. Then, the reflective optical element 5 and the lens element 5b move into the space along the optical axis AX2 (arrow b2 in FIG. 5B). Finally, the image side lens unit 6 moves toward the reflective optical element 5 along the optical axis AX2 (arrow b3 in FIG. 5B), so that the transition to the imaging state is completed.

Figure 6A:
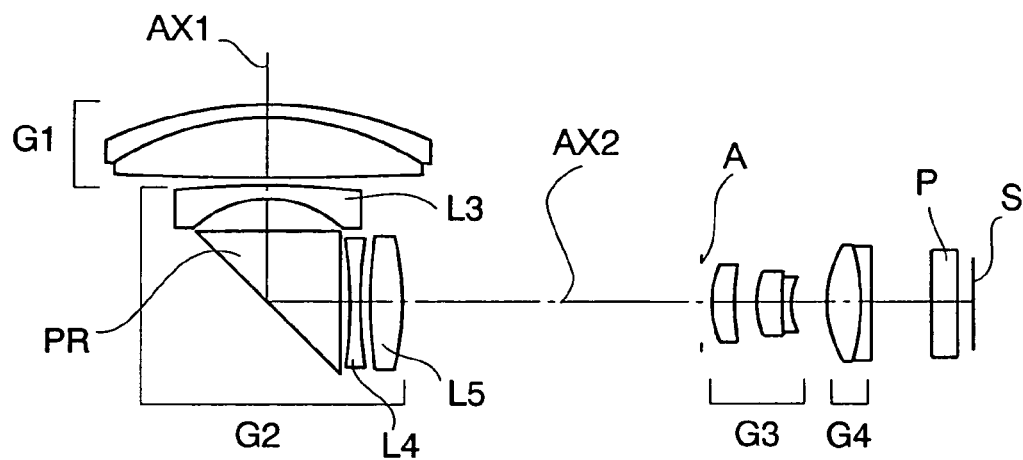
FIG. 6A is a plan view showing a lens arrangement of an imaging optical system in an imaging state at a wide-angle limit in Embodiment 2.
Figure 6B:
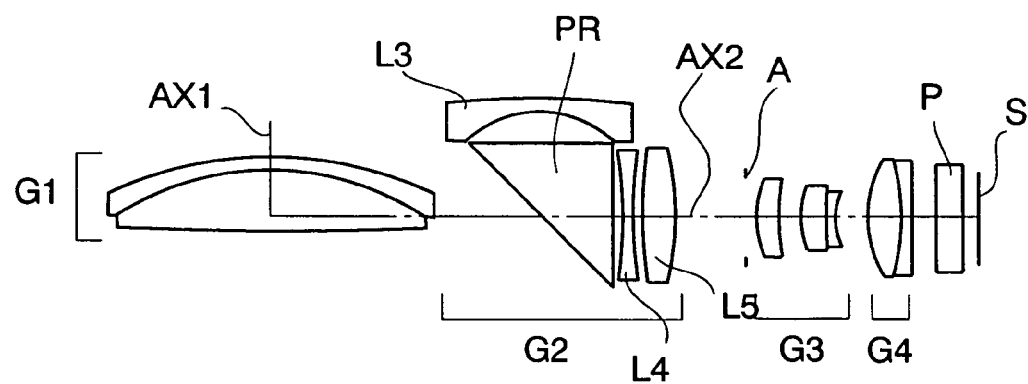
FIG. 6B is a plan view showing a lens arrangement of an imaging optical system in an accommodated state in Embodiment 2.

FIG. 6A is a plan view showing a lens arrangement of an imaging optical system in an imaging state at a wide-angle limit in Embodiment 2. FIG. 6B is a plan view showing a lens arrangement of an imaging optical system in an accommodated state.

As shown in FIGS. 6A and 6B, the imaging optical system according to the present Embodiment 2 is a zoom lens system. This zoom lens system has the same construction as the zoom lens system of Embodiment 1. That is, the zoom lens system, in order from the object side to the image side, comprises: a first lens unit G1 having positive optical power; a second lens unit G2 having negative optical power; and subsequently a diaphragm A, a third lens unit G3 and a fourth lens unit G4. Here, a straight line drawn on the right most side in the figure indicates the position of an image surface S. On the object side of the image surface S, a plane parallel plate P equivalent to an optical low-pass filter, a face plate of an image sensor or the like is provided. Further, a prism PR serving as a reflective optical element is arranged inside the second lens unit G2.

In the zoom lens system of Embodiment 2, in the accommodated state shown in FIG. 6B, the entirety of the second lens unit G2, that is, construction including the negative meniscus third lens element L3 located on the most object side, the prism PR serving as a reflective optical element and the subsequent fourth and fifth lens elements L4 and L5, is escaped integrally.

Figure 7A:
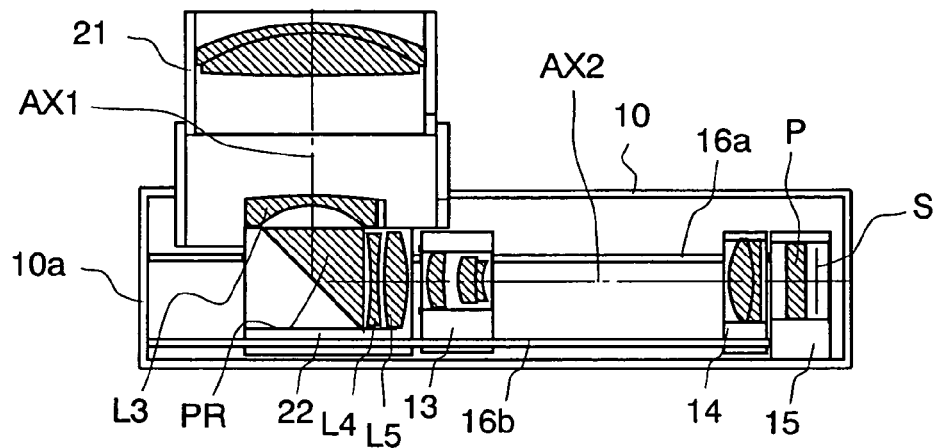
FIG. 7A is a horizontal sectional view showing an arrangement of a lens barrel in an imaging state at a telephoto limit of an imaging device according to Embodiment 2.
Figure 7B:
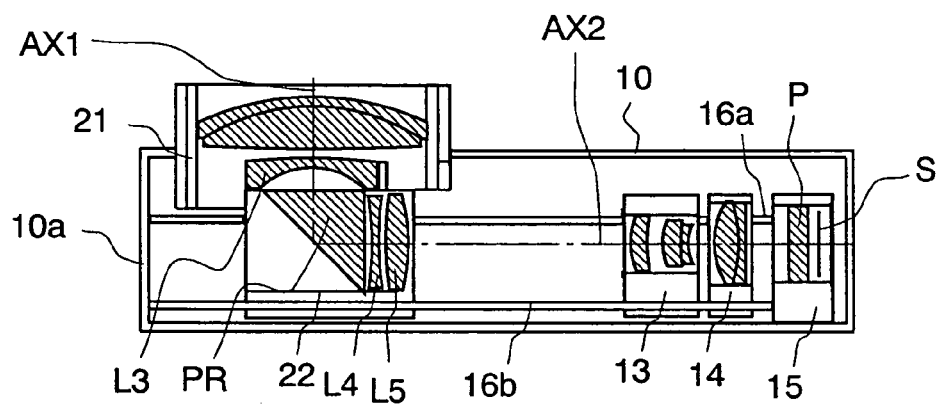
FIG. 7B is a horizontal sectional view showing an arrangement of a lens barrel in an imaging state at a wide-angle limit of an imaging device according to Embodiment 2.
Figure 7C:
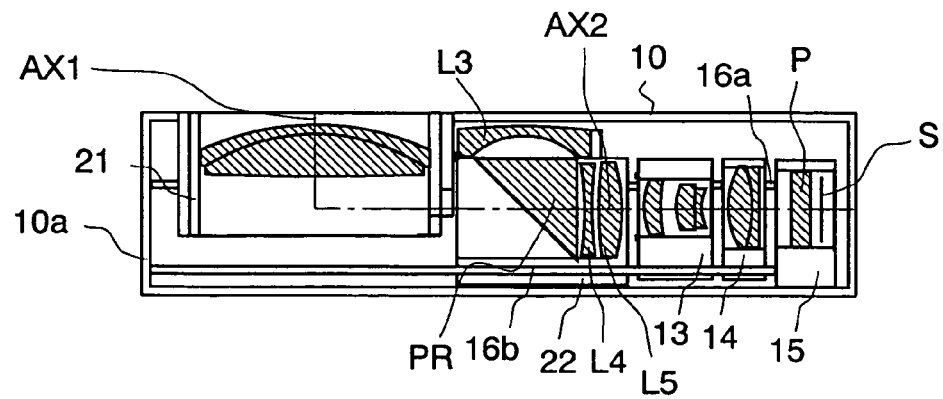
FIG. 7C is a horizontal sectional view showing an arrangement of a lens barrel in an accommodated state of an imaging device according to Embodiment 2.

FIG. 7A is a horizontal sectional view showing an arrangement of a lens barrel in an imaging state at a telephoto limit of an imaging device according to Embodiment 2. FIG. 7B is a horizontal sectional view showing an arrangement of the lens barrel in the imaging state at the wide-angle limit of the imaging device. FIG. 7C is a horizontal sectional view showing an arrangement of the lens barrel in the accommodated state of the imaging device.

As shown in FIGS. 7A, 7B and 7C, the lens barrel of Embodiment 2 is different from the lens barrel of Embodiment 1 in the point that a second lens unit holding barrel 22 holds the entirety of the second lens unit, that is, construction including the third lens element L3, the prism PR and the subsequent fourth and fifth lens elements L4 and L5.

In transition from the imaging state at the telephoto limit shown in FIG. 7A to the imaging state at the wide-angle limit shown in FIG. 7B, operation similar to that of Embodiment 1 is performed. On the other hand, in transition from the imaging state at the wide-angle limit shown in FIG. 7B to the accommodated state shown in FIG. 7C, the second lens unit holding barrel 22 moves along the optical axis AX2, and thereby escapes the entire second lens unit. After that, the first lens unit holding multi-stage barrel 21 is retracted along the optical axis AX1 with maintaining the minimum length, thereby accommodated into the main barrel 10, and then stopped.

As described above, according to the construction of the lens barrel of Embodiment 2, in addition to the common construction described in Embodiment 1, in the accommodated state, the entire second lens unit is escaped together with the reflective optical element (prism PR). Thus, in the transition from the accommodated state to the imaging state, restoration is achieved in a state that the relative positional relation is maintained in the second lens unit. This improves restoration accuracy.

Here, also for the lens barrel shown in FIGS. 7A, 7B and 7C, similarly to the above-mentioned case, the accommodated state may be the state of FIG. 7B where the transition has been completed from the state of telephoto limit to the state of wide-angle limit so that the first lens unit holding multi-stage barrel is shortened to the minimum length and then stops at a position where the interval between the first lens unit and the second lens unit becomes minimum.

(Embodiment 3)

Figure 8A:
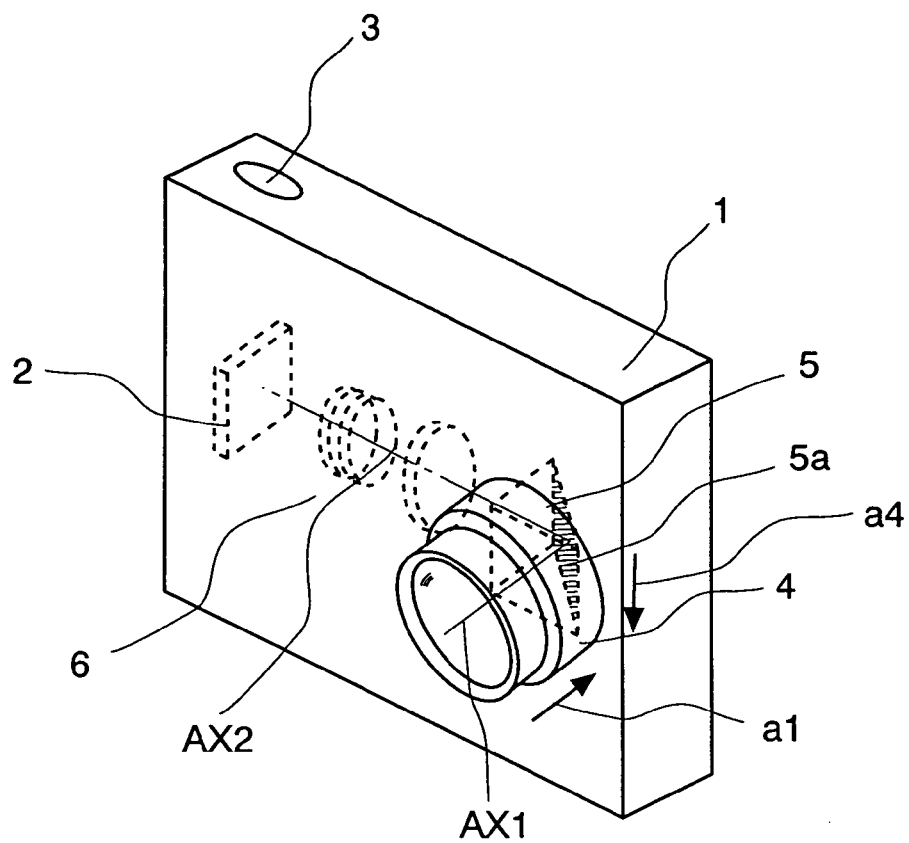
FIG. 8A is a perspective view showing a diagrammatic construction in an imaging state of a camera employing an imaging device according to Embodiment 3.
Figure 8B:
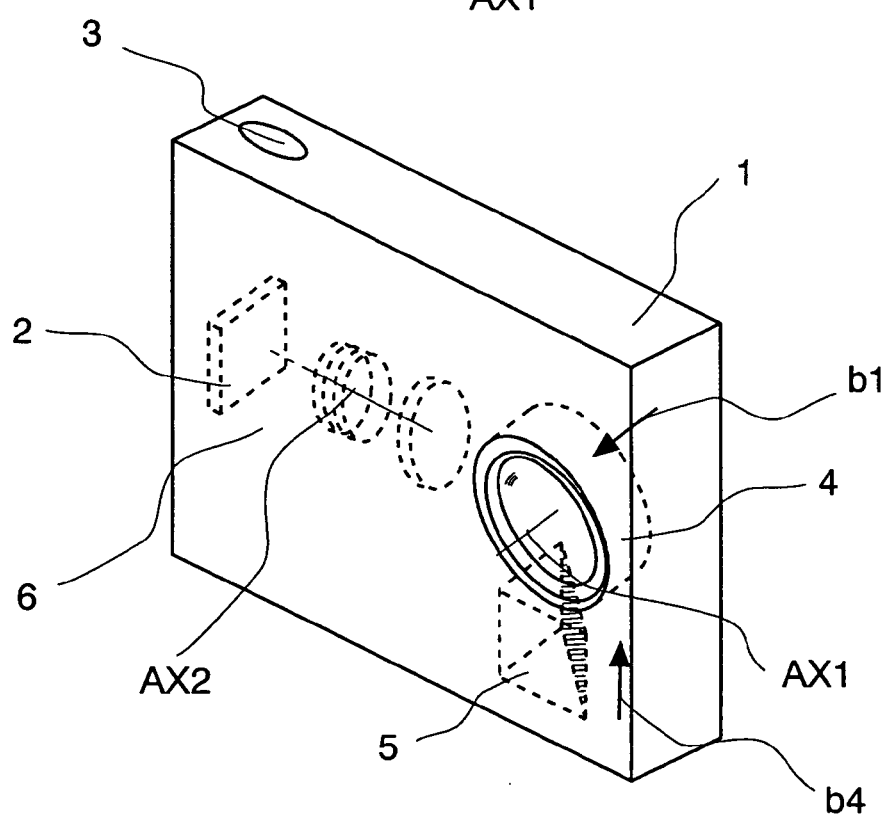
FIG. 8B is a perspective view showing a diagrammatic construction in an accommodated state of a camera employing an imaging device according to Embodiment 3.

FIG. 8A is a perspective view showing a diagrammatic construction in an imaging state of a camera (digital still camera) employing an imaging device according to Embodiment 3. FIG. 8B is a perspective view showing a diagrammatic construction in an accommodated state of the camera. Here, the same components as those of FIGS. 1A and 1B of Embodiment 1 described above are designated by the same numerals, and hence their description is omitted.

As shown in FIGS. 8A and 8B, the imaging device according to the present Embodiment 3 is different from the imaging device of Embodiment 1 in the point that the block escaped in the accommodated state is escaped not in the direction of the optical axis AX2 of the image side lens unit 6 but in a direction perpendicular to both of the optical axes AX1 and AX2.

In transition from the imaging state shown in FIG. 8A to the accommodated state shown in FIG. 8B, the reflective optical element 5 first moves in a direction perpendicular to both of the optical axes AX1 and AX2 (arrow a4 in FIG. 8A). Then, as a result of movement of the reflective optical element 5, a space is formed on the image side of the object side lens unit 4. Then, the lens holding barrel that holds the object side lens unit 4 is retracted into the space along the optical axis AX1 (arrow a1 in FIG. 8A), so that the transition to the accommodated state is completed.

On the contrary, in transition from the accommodated state shown in FIG. 8B to the imaging state shown in FIG. 8A, the lens holding barrel that holds the object side lens unit 4 is first drawn out along the optical axis AX1 (arrow b1 in FIG. 8B). Then, as a result of draw-out of the lens holding barrel that holds the object side lens unit 4, a space is formed on the image side of the object side lens unit 4. Then, the reflective optical element 5 moves into the space along the direction perpendicular to both of the optical axes AX1 and AX2 (arrow b4 in FIG. 8B), so that the transition to the imaging state is completed.

As described above, the construction of the lens barrel according to the present Embodiment 3, in addition to the common construction described in Embodiment 1, in the accommodated state, the reflective optical element 5 is escaped in the direction perpendicular to both of the optical axes AX1 and AX2. This construction adopted herein avoids the necessity of moving the image side lens unit 6 in the transition from the imaging state to the accommodated state. This simplifies the mechanism and allows the lens barrel to be constructed compactly with respect to the direction of the optical axis AX2.

Here, also for the lens barrel employed in the camera shown in FIGS. 8A and 8B, similarly to the above-mentioned case, the accommodated state may be adopted such that the transition has been completed from the state of telephoto limit to the state of wide-angle limit so that the first lens unit holding multi-stage barrel is shortened to the minimum length and then stops at a position where the interval between the first lens unit and the second lens unit becomes minimum.

(Embodiment 4)

Figure 9A:
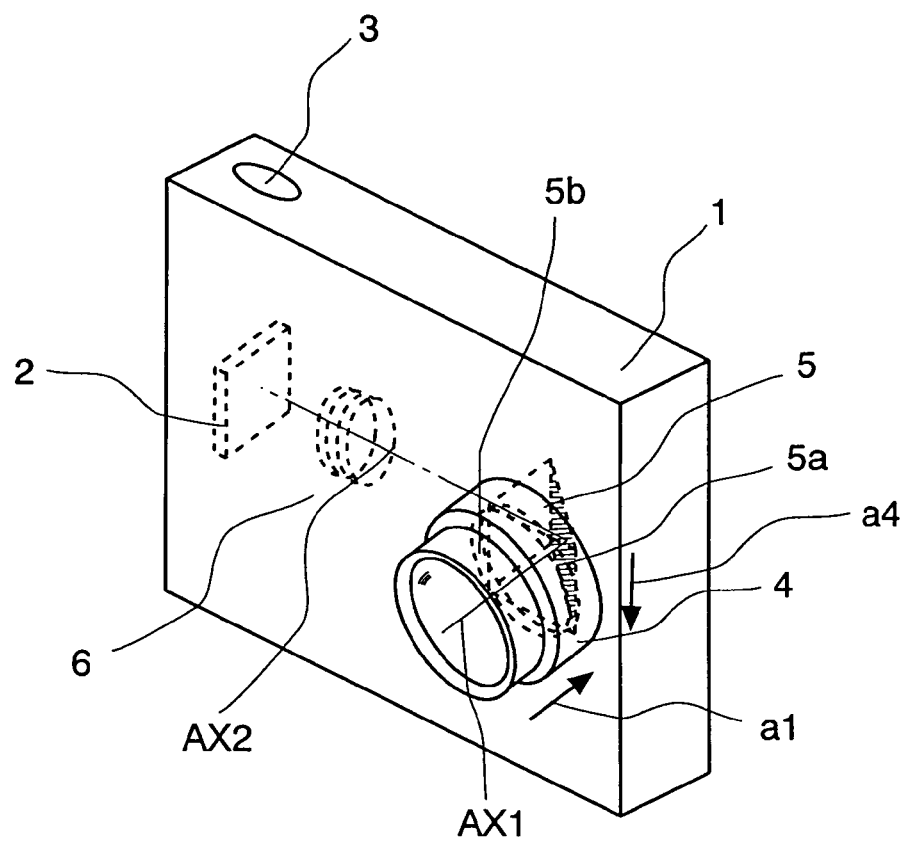
FIG. 9A is a perspective view showing a diagrammatic construction in an imaging state of a camera employing an imaging device according to Embodiment 4.
Figure 9B:
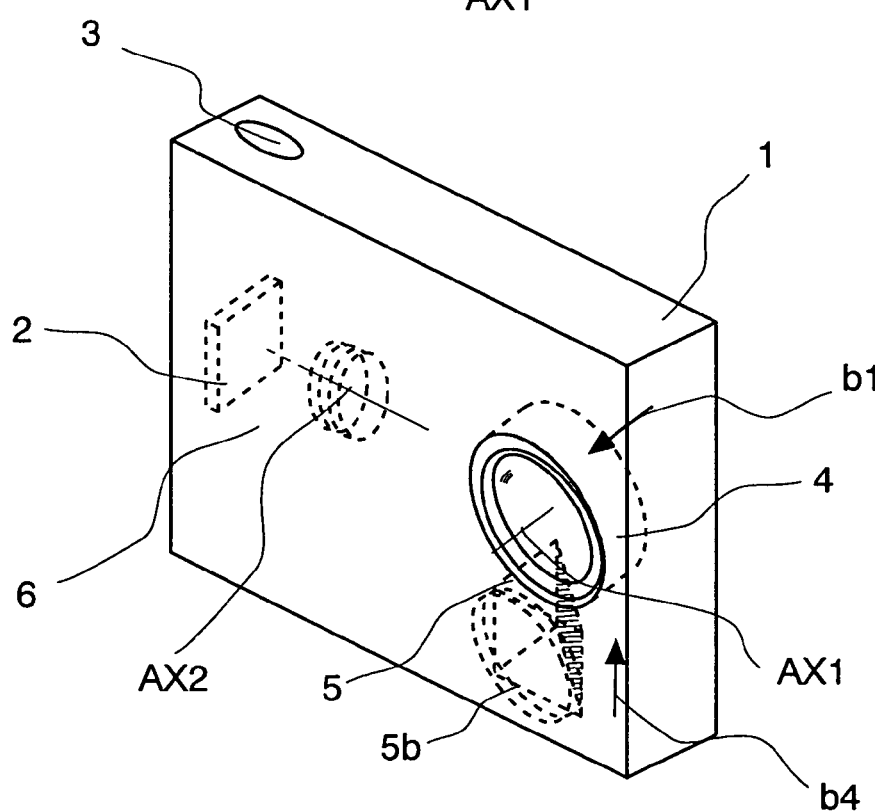
FIG. 9B is a perspective view showing a diagrammatic construction in an accommodated state of a camera employing an imaging device according to Embodiment 4.

FIG. 9A is a perspective view showing a diagrammatic construction in an imaging state of a camera (digital still camera) employing an imaging device according to Embodiment 4. FIG. 9B is a perspective view showing a diagrammatic construction in an accommodated state of the camera. Here, the same components as those of FIGS. 5A and 5B of Embodiment 2 described above are designated by the same numerals, and hence their description is omitted.

As shown in FIGS. 9A and 9B, the imaging device according to the present Embodiment 4 is different from the imaging device of Embodiment 2 in the point that the block escaped in the accommodated state is escaped not in the direction of the optical axis AX2 of the image side lens unit 6 but in a direction perpendicular to both of the optical axes AX1 and AX2.

In transition from the imaging state shown in FIG. 9A to the accommodated state shown in FIG. 9B, the reflective optical element 5 and the lens element 5b first move in a direction perpendicular to both of the optical axes AX1 and AX2 (arrow a4 in FIG. 9A). Then, as a result of movement of the reflective optical element 5 and the lens element 5b, a space is formed on the image side of the object side lens unit 4. Then, the lens holding barrel that holds the object side lens unit 4 is retracted into the space along the optical axis AX1 (arrow a1 in FIG. 9A), so that the transition to the accommodated state is completed.

On the contrary, in transition from the accommodated state shown in FIG. 9B to the imaging state shown in FIG. 9A, the lens holding barrel that holds the object side lens unit 4 is first drawn out along the optical axis AX1 (arrow b1 in FIG. 9B). Then, as a result of draw-out of the lens holding barrel that holds the object side lens unit 4, a space is formed on the image side of the object side lens unit 4. Then, the reflective optical element 5 and the lens element 5b move into the space along the direction perpendicular to both of the optical axes AX1 and AX2 (arrow b4 in FIG. 9B), so that the transition to the imaging state is completed.

As described above, the construction of the lens barrel according to the present Embodiment 4, in addition to the common construction described in Embodiment 2, in the accommodated state, the reflective optical element 5 and the lens element 5b are escaped in the direction perpendicular to both of the optical axes AX1 and AX2. This construction adopted herein avoids the necessity of moving the image side lens unit 6 in the transition from the imaging state to the accommodated state. This simplifies the mechanism and allows the lens barrel to be constructed compactly with respect to the direction of the optical axis AX2.

Here, also for the lens barrel employed in the camera shown in FIGS. 9A and 9B, similarly to the above-mentioned case, the accommodated state may be adopted such that the transition has been completed from the state of telephoto limit to the state of wide-angle limit so that the first lens unit holding multi-stage barrel is shortened to the minimum length and then stops at a position where the interval between the first lens unit and the second lens unit becomes minimum.

(Embodiment 5)

Figure 10A:
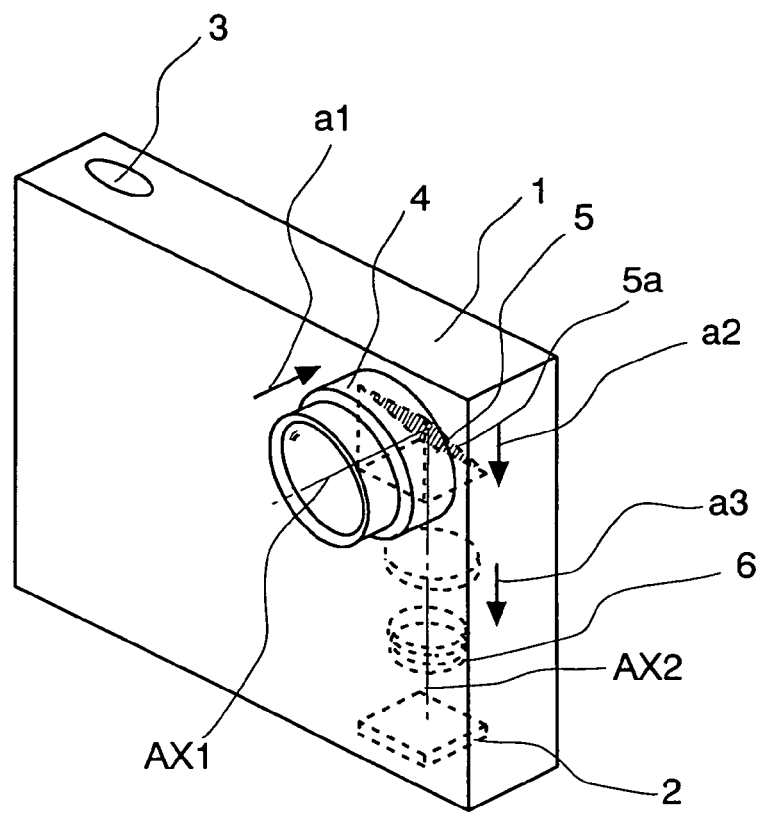
FIG. 10A is a perspective view showing a diagrammatic construction in an imaging state of a camera employing an imaging device according to Embodiment 5.
Figure 10B:
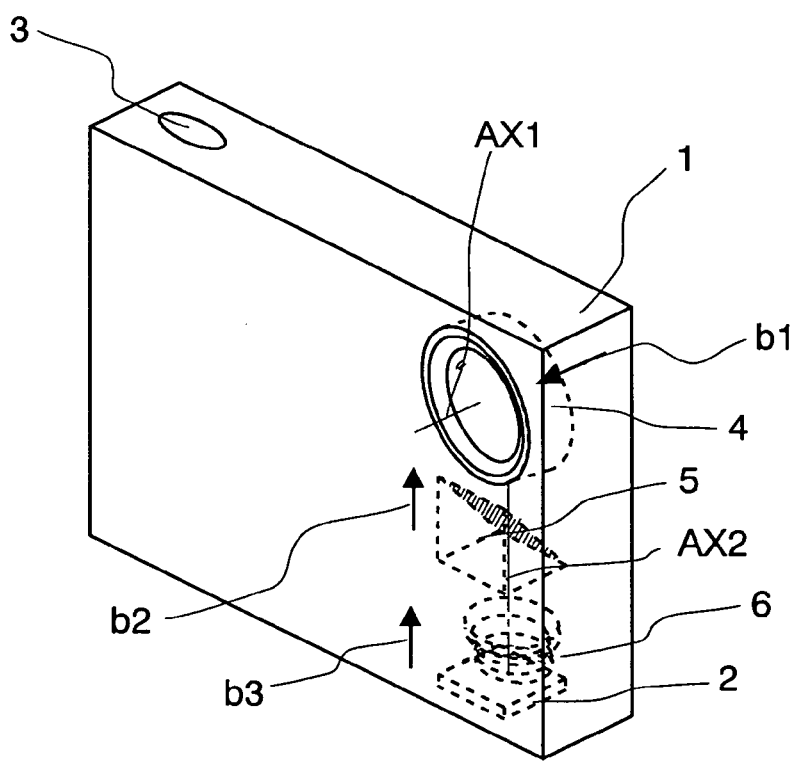
FIG. 10B is a perspective view showing a diagrammatic construction in an accommodated state of a camera employing an imaging device according to Embodiment 5.

FIG. 10A is a perspective view showing a diagrammatic construction in an imaging state of a camera (digital still camera) employing an imaging device according to Embodiment 5. FIG. 10B is a perspective view showing a diagrammatic construction in an accommodated state of the camera. Here, the same components as those of FIGS. 1A and 1B of Embodiment 1 described above are designated by the same numerals, and hence their description is omitted.

As shown in FIGS. 10A and 10B, the imaging device according to the present Embodiment 5 has the same construction as the imaging device according to Embodiment 1 described above. However, a difference is present concerning the direction of the optical axis AX2 in the layout of the imaging device in the camera body 1. That is, in the camera employing the imaging device according to Embodiment 1 described above, the optical axis AX2 has been arranged perpendicularly to the stroke direction of the shutter button 3, so that the imaging device has been arranged horizontally. In contrast, in the camera employing the imaging device according to the present Embodiment 5, the optical axis AX2 is arranged in parallel to the stroke direction of the shutter button 3, so that the imaging device is arranged vertically.

The imaging device according to the present Embodiment 5, arrangement flexibility is increased when the imaging device is applied to the camera, and so is the flexibility in designing of a camera.

Here, also for the lens barrel employed in the camera shown in FIGS. 10A and 10B, similarly to the above-mentioned case, the accommodated state may be adopted such that the transition has been completed from the state of telephoto limit to the state of wide-angle limit so that the first lens unit holding multi-stage barrel is shortened to the minimum length and then stops at a position where the interval between the first lens unit and the second lens unit becomes minimum.

As described above, the imaging device according to Embodiments 1 to 5 can output an optical image of an object, in the form of an electric image signal. Then, the imaging device comprises: a lens barrel for holding an imaging optical system that forms the optical image of an object; and an image sensor for converting the optical image formed by the imaging optical system into the electric image signal. Further, the imaging optical system, in order from the object side to the image side, comprises: a first lens unit having positive optical power; a second lens unit that includes a reflective optical element having a reflecting surface for bending a light ray from an object and that has negative optical power; and a subsequent lens unit including at least one lens unit having positive optical power. Furthermore, in the accommodated state, the lens barrel causes the reflective optical element to be escaped to a position different from a position located in the imaging state.

Further, the camera according to Embodiments 1 to 5 converts an optical image of an object into an electric image signal, and performs at least one of the display and the storage of the converted image signal. Then, the camera comprises: a lens barrel for holding an imaging optical system that forms the optical image of an object; an image sensor for converting the optical image formed by the imaging optical system into the electric image signal; and a camera body for accommodating at least the part constituting the imaging optical system on the image side relative to the reflective optical element and the image sensor. Further, the imaging optical system, in order from the object side to the image side, comprises: a first lens unit having positive optical power; a second lens unit that includes a reflective optical element having a reflecting surface for bending a light ray from an object and that has negative optical power; and a subsequent lens unit including at least one lens unit having positive optical power. Furthermore, in the accommodated state, the lens barrel causes the reflective optical element to be escaped to a position different from a position located in the imaging state.

Here, in the imaging device and the camera according to Embodiments 1 to 5, a lens barrel has been provided that, in the accommodated state, causes the reflective optical element to be escaped to an escape position different from a position located in the imaging state. However, in place of this lens barrel, another lens barrel may be employed that, in the accommodated state, fixes the reflective optical element to the same position as located in the imaging state.

A zoom lens system applicable to the imaging device and the camera according to Embodiments 1 to 5 is described below in further detail.

(Embodiments 6 to 12)

Figure 11A:
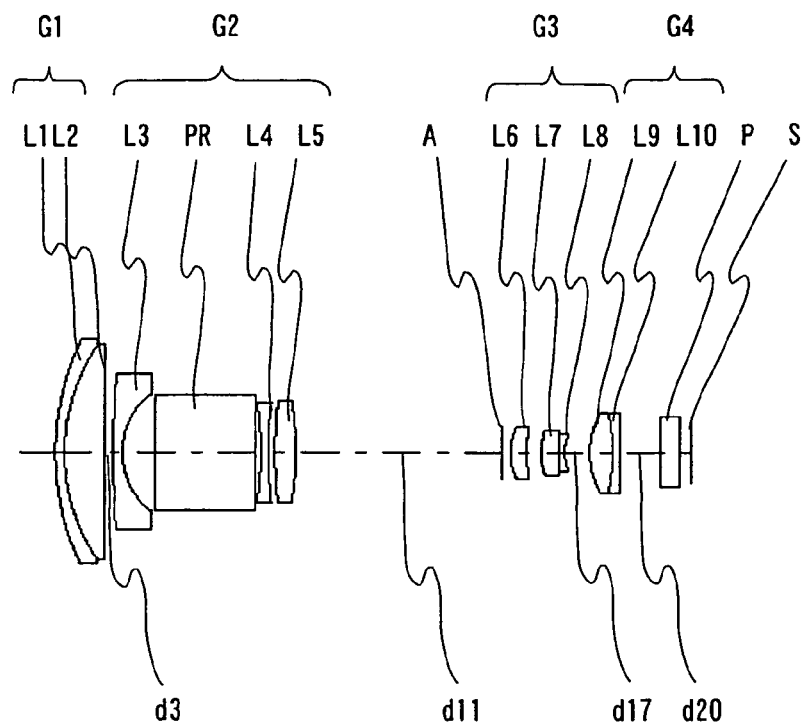
FIGS. 11A to 11C are lens arrangement diagrams at a wide-angle limit, a middle position and a telephoto limit of a zoom lens system according to Embodiment 6 (Example 1)
Figure 11B:
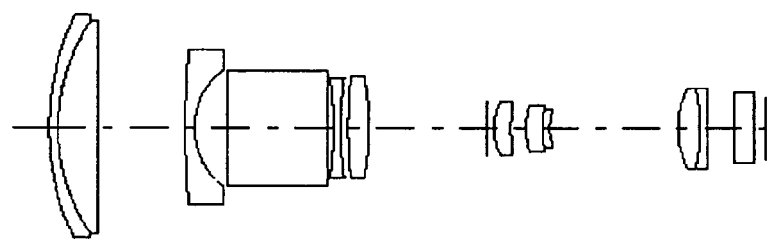
Figure 11C:
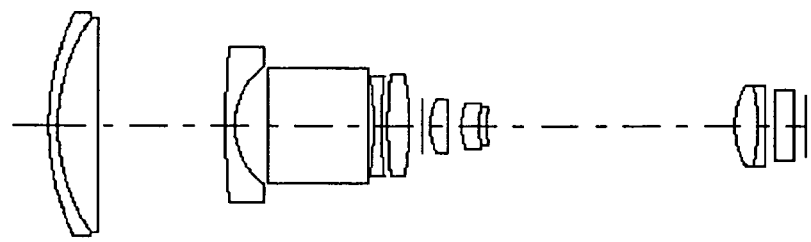
Figure 12A:
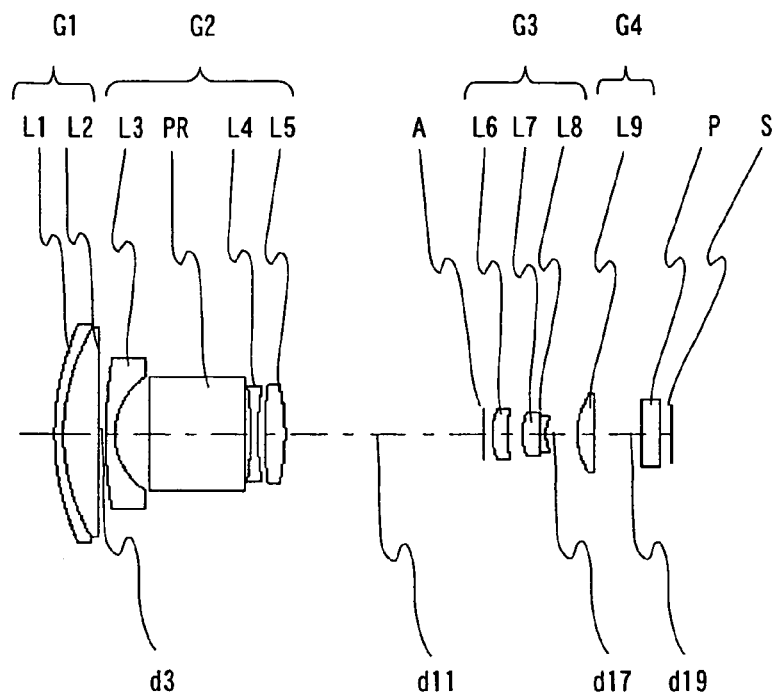
FIGS. 12A to 12C are lens arrangement diagrams at a wide-angle limit, a middle position and a telephoto limit of a zoom lens system according to Embodiment 7 (Example 2)
Figure 12B:
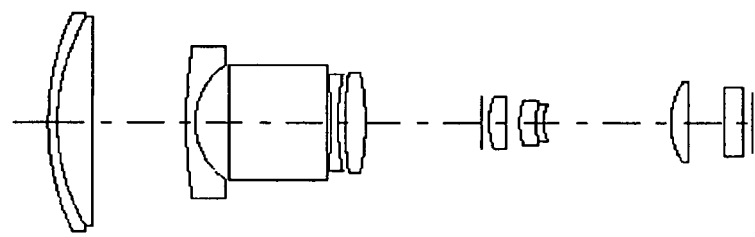
Figure 12C:
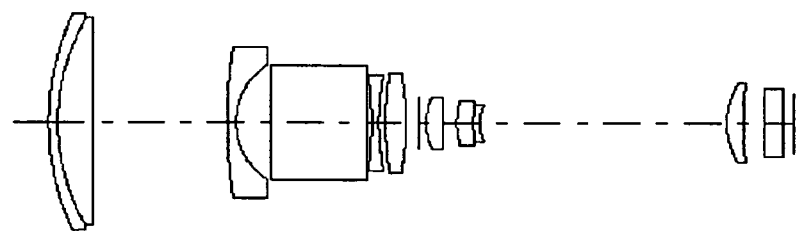
Figure 13A:
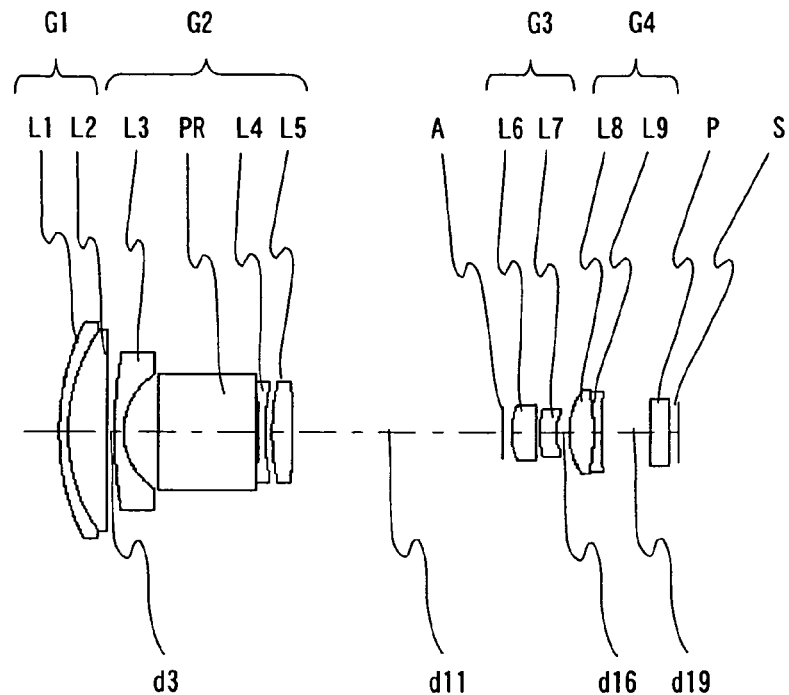
FIGS. 13A to 13C are lens arrangement diagrams at a wide-angle limit, a middle position and a telephoto limit of a zoom lens system according to Embodiment 8 (Example 3)
Figure 13B:
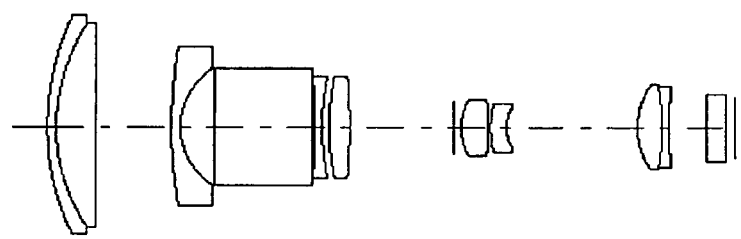
Figure 13C:
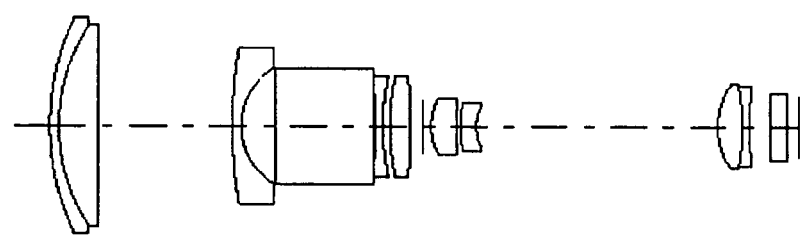
Figure 14A:
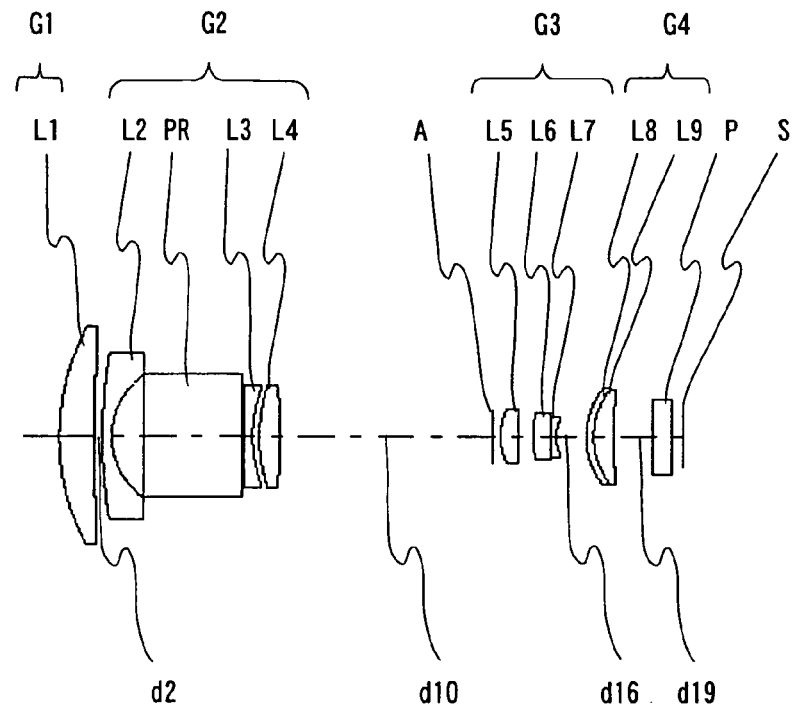
FIGS. 14A to 14C are lens arrangement diagrams at a wide-angle limit, a middle position and a telephoto limit of a zoom lens system according to Embodiment 9 (Example 4)
Figure 14B:
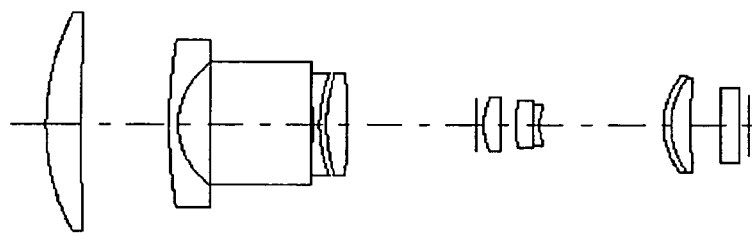
Figure 14C:
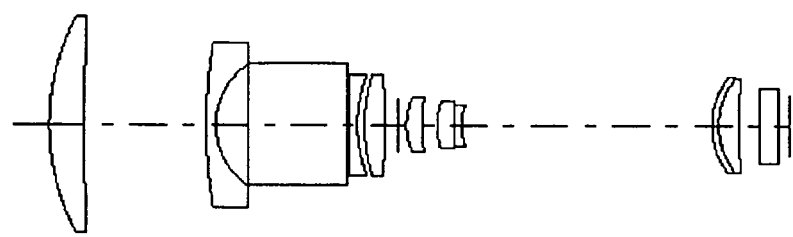
Figure 15A:
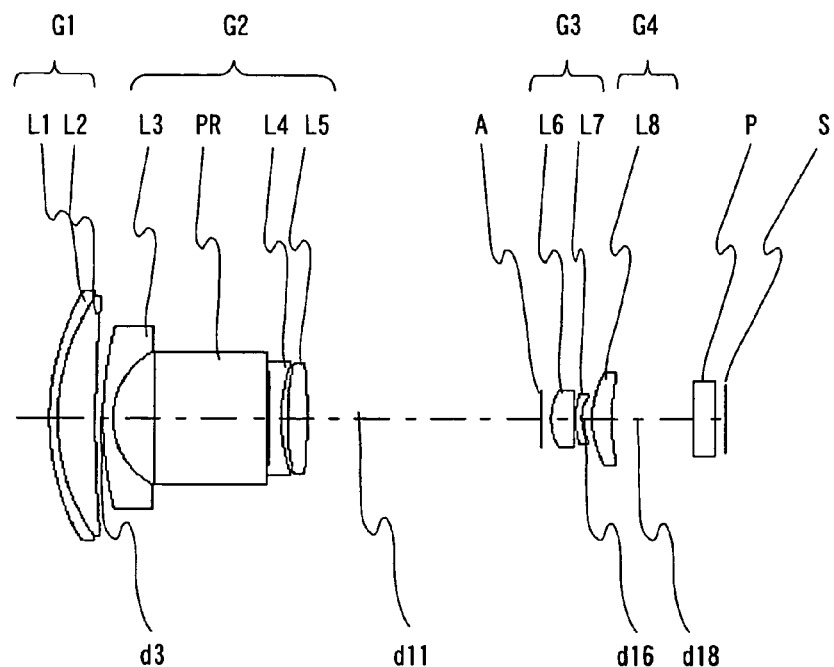
FIGS. 15A to 15C are lens arrangement diagrams at a wide-angle limit, a middle position and a telephoto limit of a zoom lens system according to Embodiment 10 (Example 5)
Figure 15B:
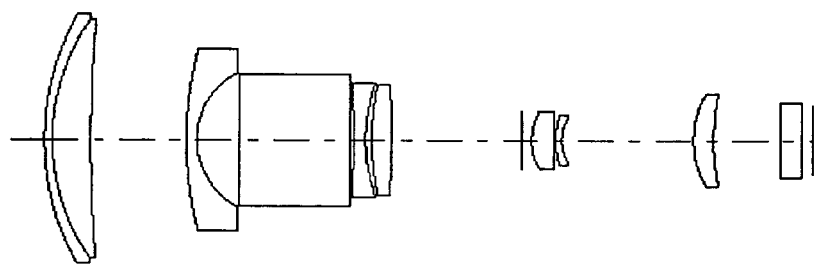
Figure 15C:
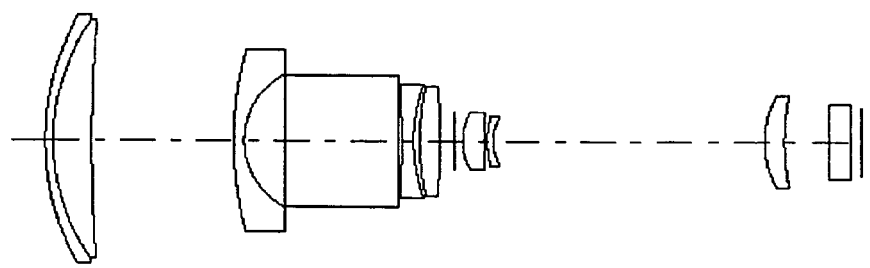
Figure 16A:
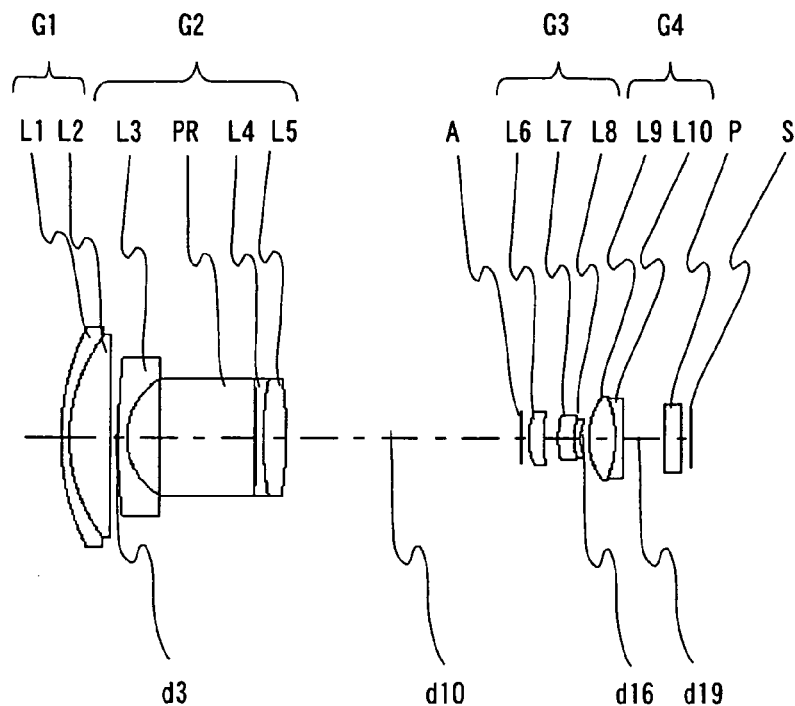
FIGS. 16A to 16C are lens arrangement diagrams at a wide-angle limit, a middle position and a telephoto limit of a zoom lens system according to Embodiment 11 (Example 6)
Figure 16B:
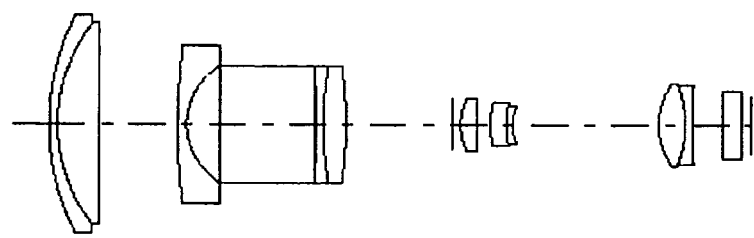
Figure 16C:
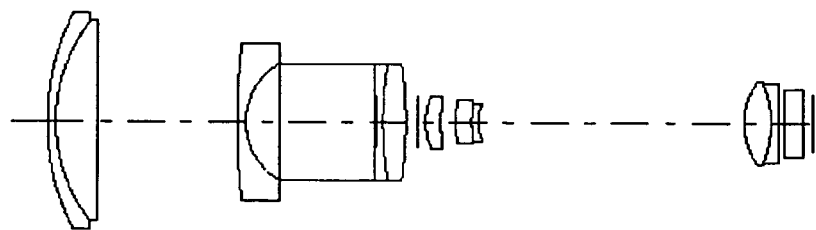
Figure 17A:
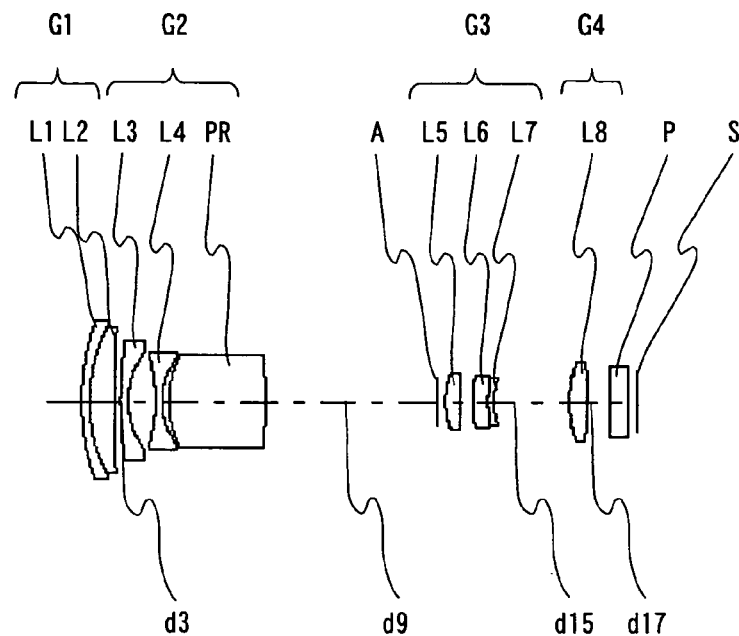
FIGS. 17A to 17C are lens arrangement diagrams at a wide-angle limit, a middle position and a telephoto limit of a zoom lens system according to Embodiment 12 (Example 7)
Figure 17B:
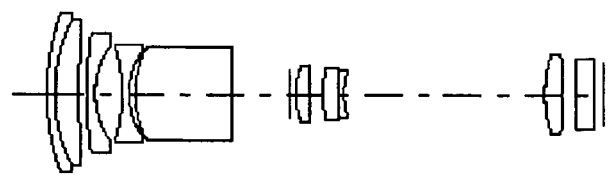
Figure 17C:
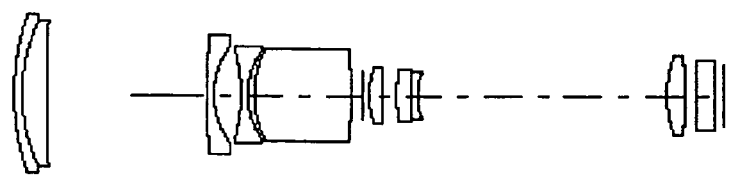
Figure 22A:
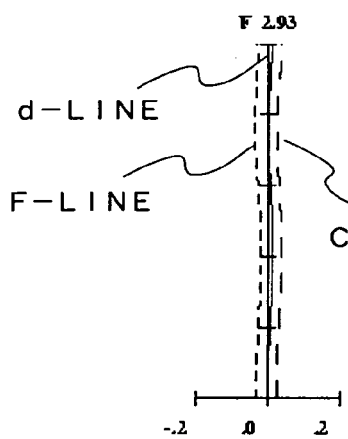
FIGS. 22A to 22I are longitudinal aberration diagrams at a wide-angle limit, a middle position and a telephoto limit in a zoom lens system according to Example 5.
Figure 22B:
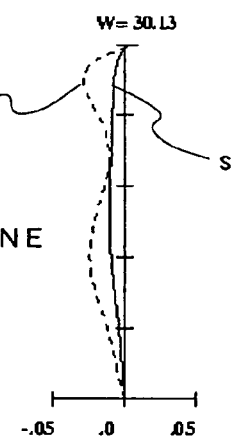
Figure 22C:
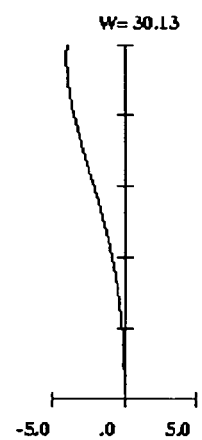
Figure 22D:
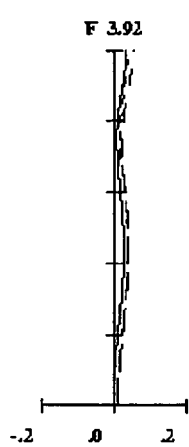
Figure 22E:
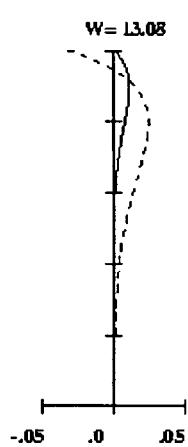
Figure 22F:
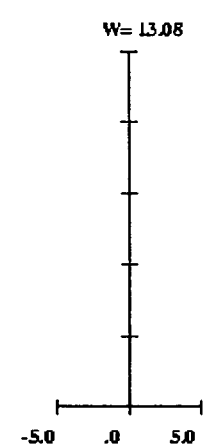
Figure 22G:
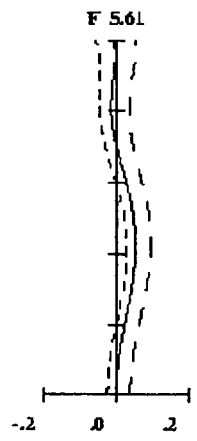
Figure 22H:
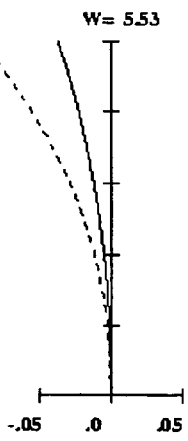
Figure 22I:
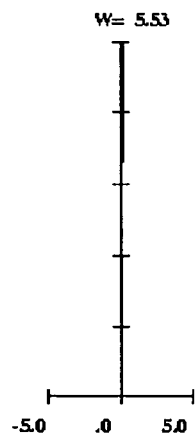
Figure 23A:
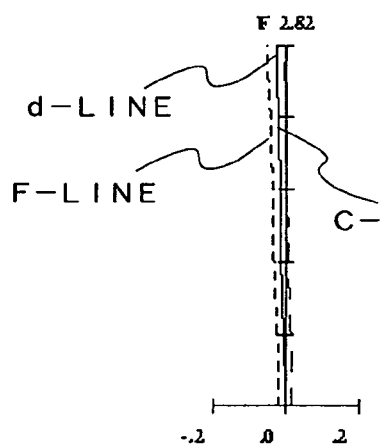
FIGS. 23A to 23I are longitudinal aberration diagrams at a wide-angle limit, a middle position and a telephoto limit in a zoom lens system according to Example 6.
Figure 23B:
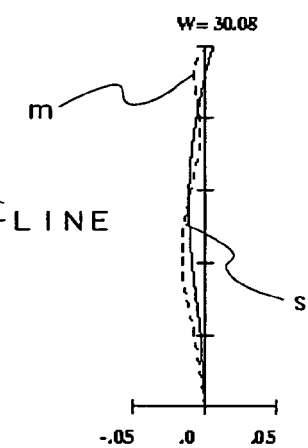
Figure 23C:
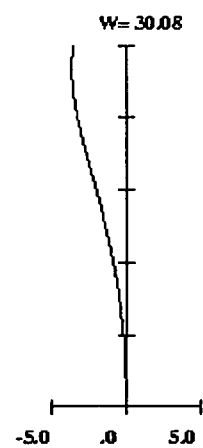
Figure 23D:
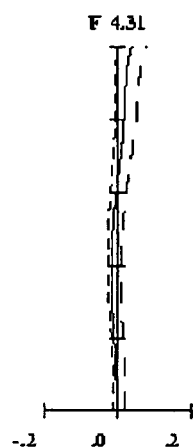
Figure 23E:
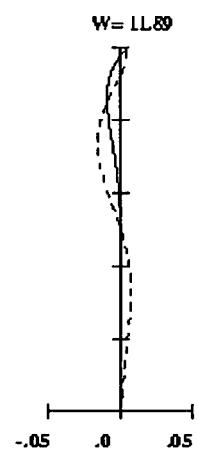
Figure 23F:
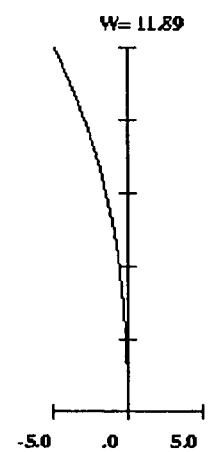
Figure 23G:
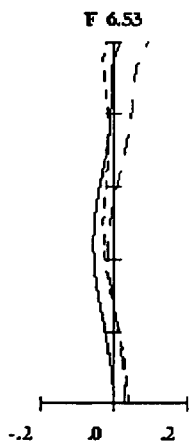
Figure 23H:
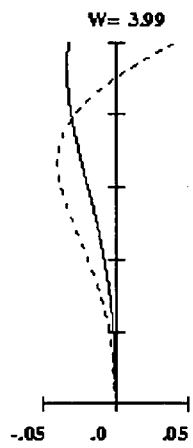
Figure 23I:
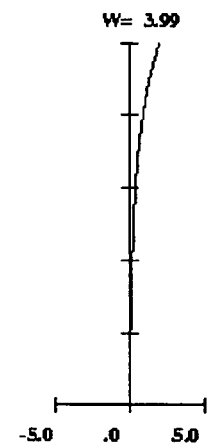
Figure 24A:
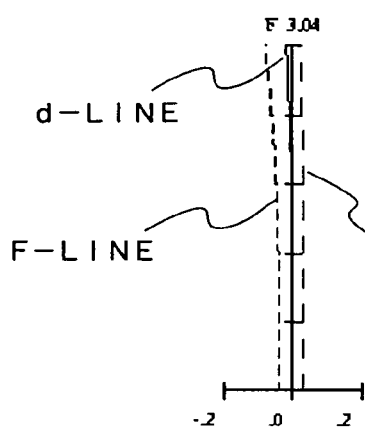
FIGS. 24A to 24I are longitudinal aberration diagrams at a wide-angle limit, a middle position and a telephoto limit in a zoom lens system according to Example 7.
Figure 24B:
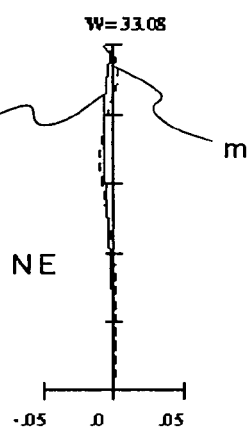
Figure 24C:
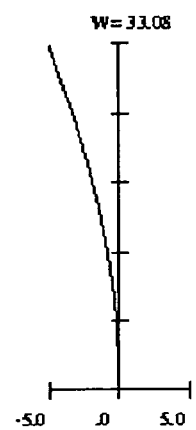
Figure 24D:
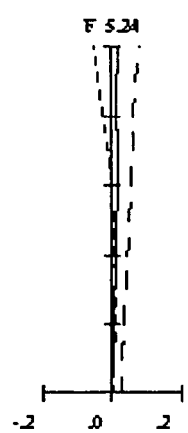
Figure 24E:
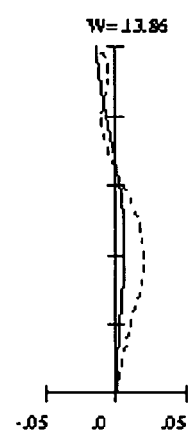
Figure 24F:
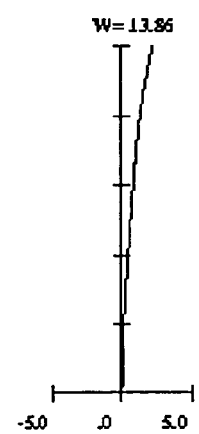
Figure 24G:
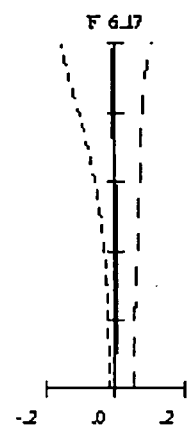
Figure 24H:
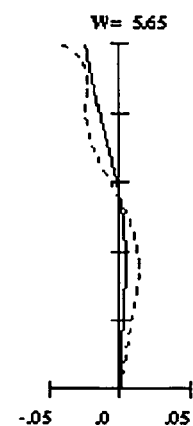
Figure 24I:
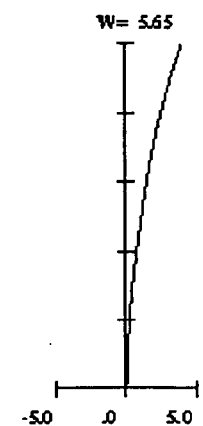

FIGS. 11A to 11C are lens arrangement diagrams of a zoom lens system according to Embodiment 6. FIGS. 12A to 12C are lens arrangement diagrams of a zoom lens system according to Embodiment 7. FIGS. 13A to 13C are lens arrangement diagrams of a zoom lens system according to Embodiment 8. FIGS. 14A to 14C are lens arrangement diagrams of a zoom lens system according to Embodiment 9. FIGS. 15A to 15C are lens arrangement diagrams of a zoom lens system according to Embodiment 10. FIGS. 16A to 16C are lens arrangement diagrams of a zoom lens system according to Embodiment 11. FIGS. 17A to 17C are lens arrangement diagrams of a zoom lens system according to Embodiment 12. FIGS. 11A, 12A, 13A, 14A, 15A, 16A and 17A are lens arrangement diagrams at a wide-angle limit (the shortest focal length condition: focal length $f_W$). FIGS. 11B, 12B, 13B, 14B, 15B, 16B and 17B are lens arrangement diagrams at a middle position (middle focal length condition: focal length $f_M=(f_W*f_T)^{1/2}$). FIGS. 11C, 12C, 13C, 14C, 15C, 16C and 17C are lens arrangement diagrams at a telephoto limit (the longest focal length condition: focal length $f_T$).

As shown in FIGS. 11A to 11C, FIGS. 12A to 12C, FIGS. 13A to 13C, FIGS. 14A to 14C, FIGS. 15A to 15C, FIGS. 16A to 16C and FIGS. 17A to 17C, the zoom lens system according to Embodiments 6 to 12, in order from the object side to the image side, comprises: a first lens unit G1 having positive optical power; a second lens unit G2 having negative optical power; a diaphragm A; a third lens unit G3 having positive optical power; and a fourth lens unit G4 having positive optical power. Here, a prism PR serving as a reflective optical element has a reflecting surface in the inside. However, in FIGS. 11A to 11C, FIGS. 12A to 12C, FIGS. 13A to 13C, FIGS. 14A to 14C, FIGS. 15A to 15C, FIGS. 16A to 16C and FIGS. 17A to 17C, the reflecting surface is omitted. Further, in FIGS. 11A to 11C, FIGS. 12A to 12C, FIGS. 13A to 13C, FIGS. 14A to 14C, FIGS. 15A to 15C, FIGS. 16A to 16C and FIGS. 17A to 17C, a straight line drawn on the right most side indicates the position of an image surface S. On the object side of the image surface S, a plane parallel plate P such as an optical low-pass filter, a face plate of an image sensor or the like is provided. Then, when these lens units are arranged in a desired optical power arrangement, size reduction is achieved in the entire zoom lens system in a state that a high magnification variation ratio is achieved and that the required optical performance is satisfied.

As shown in FIGS. 11A to 11C, in the zoom lens system of Embodiment 6, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

In the zoom lens system of Embodiment 6, the second lens unit G2, in order from the object side to the image side, comprises: a negative meniscus third lens element L3 with the convex surface facing the object side; a prism PR (reflective optical element) whose incident and exit surfaces are both plane; a bi-concave fourth lens element L4; and a bi-convex fifth lens element L5.

In the zoom lens system of Embodiment 6, the third lens unit G3, in order from the object side to the image side, comprises: a positive meniscus sixth lens element L6 with the convex surface facing the object side; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other.

In the zoom lens system of Embodiment 6, the fourth lens unit G4, in order from the object side to the image side, comprises a bi-convex ninth lens element L9 and a bi-concave tenth lens element L10. The ninth lens element L9 and the tenth lens element L10 are cemented with each other.

In the zoom lens system of Embodiment 6, in zooming from the wide-angle limit to the telephoto limit, the first lens unit G1 and the third lens unit G3 move to the object side, while the fourth lens unit G4 moves to the image side. Further, in zooming from the wide-angle limit to the telephoto limit, the second lens unit G2 is fixed relative to the image surface.

As shown in FIGS. 12A to 12C, in the zoom lens system of Embodiment 7, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

In the zoom lens system of Embodiment 7, the second lens unit G2, in order from the object side to the image side, comprises: a negative meniscus third lens element L3 with the convex surface facing the object side; a prism PR (reflective optical element) whose incident and exit surfaces are both plane; a bi-concave fourth lens element L4; and a bi-convex fifth lens element L5.

In the zoom lens system of Embodiment 7, the third lens unit G3, in order from the object side to the image side, comprises: a positive meniscus sixth lens element L6 with the convex surface facing the object side; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other.

In the zoom lens system of Embodiment 7, the fourth lens unit G4 comprises solely a positive meniscus ninth lens element L9 with the convex surface facing the object side.

In the zoom lens system of Embodiment 7, in zooming from the wide-angle limit to the telephoto limit, the first lens unit G1 and the third lens unit G3 move to the object side, while the fourth lens unit G4 moves to the image side. Further, in zooming from the wide-angle limit to the telephoto limit, the second lens unit G2 is fixed relative to the image surface.

As shown in FIGS. 13A to 13C, in the zoom lens system of Embodiment 8, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other.

In the zoom lens system of Embodiment 8, the second lens unit G2, in order from the object side to the image side, comprises: a negative meniscus third lens element L3 with the convex surface facing the object side; a prism PR (reflective optical element) whose incident and exit surfaces are both plane; a bi-concave fourth lens element L4; and a bi-convex fifth lens element L5.

In the zoom lens system of Embodiment 8, the third lens unit G3, in order from the object side to the image side, comprises: a bi-convex sixth lens element L6; and a negative meniscus seventh lens element L7 with the convex surface facing the object side.

In the zoom lens system of Embodiment 8, the fourth lens unit G4, in order from the object side to the image side, comprises a bi-convex eighth lens element L8 and a bi-concave ninth lens element L9. The eighth lens element L8 and the ninth lens element L9 are cemented with each other.

In the zoom lens system of Embodiment 8, in zooming from the wide-angle limit to the telephoto limit, the first lens unit G1 and the third lens unit G3 move to the object side, while the fourth lens unit G4 moves to the image side. Further, in zooming from the wide-angle limit to the telephoto limit, the second lens unit G2 is fixed relative to the image surface.

As shown in FIGS. 14A to 14C, in the zoom lens system according to Embodiment 9, the first lens unit G1 comprises solely a positive meniscus first lens element L1 with the convex surface facing the object side.

In the zoom lens system of Embodiment 9, the second lens unit G2, in order from the object side to the image side, comprises: a negative meniscus second lens element L2 with the convex surface facing the object side; a prism PR (reflective optical element) whose incident and exit surfaces are both plane; a bi-concave third lens element L3; and a bi-convex fourth lens element L4.

In the zoom lens system of Embodiment 9, the third lens unit G3, in order from the object side to the image side, comprises: a positive meniscus fifth lens element L5 with the convex surface facing the object side; a bi-convex sixth lens element L6; and a bi-concave seventh lens element L7. Among these, the sixth lens element L6 and the seventh lens element L7 are cemented with each other.

In the zoom lens system of Embodiment 9, the fourth lens unit G4, in order from the object side to the image side, comprises: a negative meniscus eighth lens element L8 with the convex surface facing the object side; and a positive meniscus ninth lens element L9 with the convex surface facing the object side. The eighth lens element L8 and the ninth lens element L9 are cemented with each other.

In the zoom lens system of Embodiment 9, in zooming from the wide-angle limit to the telephoto limit, the first lens unit G1 and the third lens unit G3 move to the object side, while the fourth lens unit G4 moves to the image side. Further, in zooming from the wide-angle limit to the telephoto limit, the second lens unit G2 is fixed relative to the image surface.

As shown in FIGS. 15A to 15C, in the zoom lens system of Embodiment 10, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other.

In the zoom lens system of Embodiment 10, the second lens unit G2, in order from the object side to the image side, comprises: a negative meniscus third lens element L3 with the convex surface facing the object side; a prism PR (reflective optical element) whose incident and exit surfaces are both plane; a bi-concave fourth lens element L4; and a bi-convex fifth lens element L5.

In the zoom lens system of Embodiment 10, the third lens unit G3, in order from the object side to the image side, comprises: a positive meniscus sixth lens element L6 with the convex surface facing the object side; and a negative meniscus seventh lens element L7 with the convex surface facing the object side.

In the zoom lens system of Embodiment 10, the fourth lens unit G4 comprises solely a positive meniscus eighth lens element L8 with the convex surface facing the object side.

In the zoom lens system of Embodiment 10, in zooming from the wide-angle limit to the telephoto limit, the first lens unit G1 and the third lens unit G3 move to the object side, while the fourth lens unit G4 moves to the image side. Further, in zooming from the wide-angle limit to the telephoto limit, the second lens unit G2 is fixed relative to the image surface.

As shown in FIGS. 16A to 16C, in the zoom lens system of Embodiment 11, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

In the zoom lens system of Embodiment 11, the second lens unit G2, in order from the object side to the image side, comprises: a negative meniscus third lens element L3 with the convex surface facing the object side; a prism PR (reflective optical element) whose incident and exit surfaces are both plane; a bi-concave fourth lens element L4; and a bi-convex fifth lens element L5. Among these, the fourth lens element L4 and the fifth lens element L5 are cemented with each other.

In the zoom lens system of Embodiment 11, the third lens unit G3, in order from the object side to the image side, comprises: a positive meniscus sixth lens element L6 with the convex surface facing the object side; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other.

In the zoom lens system of Embodiment 11, the fourth lens unit G4, in order from the object side to the image side, comprises a bi-convex ninth lens element L9 and a bi-concave tenth lens element L10. The ninth lens element L9 and the tenth lens element L10 are cemented with each other.

In the zoom lens system of Embodiment 11, in zooming from the wide-angle limit to the telephoto limit, the first lens unit G1 and the third lens unit G3 move to the object side, while the fourth lens unit G4 moves to the image side. Further, in zooming from the wide-angle limit to the telephoto limit, the second lens unit G2 is fixed relative to the image surface.

As shown in FIGS. 17A to 17C, in the zoom lens system of Embodiment 12, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other.

In the zoom lens system of Embodiment 12, the second lens unit G2, in order from the object side to the image side, comprises: a negative meniscus third lens element L3 with the convex surface facing the object side; a bi-concave fourth lens element L4; and a prism PR (reflective optical element) whose incident and exit surfaces are both convex.

In the zoom lens system of Embodiment 12, the third lens unit G3, in order from the object side to the image side, comprises: a bi-convex fifth lens element L5; a positive meniscus sixth lens element L6 with the convex surface facing the object side; and a negative meniscus seventh lens element L7 with the convex surface facing the object side. Among these, the sixth lens element L6 and the seventh lens element L7 are cemented with each other.

In the zoom lens system of Embodiment 12, the fourth lens unit G4 comprises solely a bi-convex eighth lens element L8.

In the zoom lens system of Embodiment 12, in zooming from the wide-angle limit to the telephoto limit, the first lens unit G1 and the third lens unit G3 move to the object side, while the fourth lens unit G4 moves to the image side. Further, in zooming from the wide-angle limit to the telephoto limit, the second lens unit G2 is fixed relative to the image surface.

In Embodiments 6 to 12, movement of the first lens unit G1 and the third lens unit G3 in zooming is not limited as long as the first lens unit G1 and the third lens unit G3 are positioned on the object side at the telephoto limit relative to the position at the wide-angle limit, respectively. For example, the first lens unit G1 and the third lens unit G3 can move to the object side, flatly, with locus of a convex toward the object side, or with locus of a convex toward the image side. In addition, these loci of movement can be suitably combined with each other. For example, the first lens unit G1 and the third lens unit G3 can move to the object side flatly in a first focal length region and then, move with locus of a convex toward the image side in a second focal length region differing from the first focal length region. Furthermore, in the specified focal length region, the first lens unit G1 and the third lens unit G3 can be fixed relative to the image surface, or move to the image side. In contrast, movement of the fourth lens unit G4 in zooming is not limited as long as the fourth lens unit G4 is positioned on the image side at the telephoto limit relative to the position at the wide-angle limit. For example, the fourth lens unit G4 can move to the image side, flatly, with locus of a convex toward the object side, or with locus of a convex toward the image side. In addition, these loci of movement can be suitably combined with each other. For example, the fourth lens unit G4 can move to the image side flatly in a first focal length region and then, move with locus of a convex toward the object side in a second focal length region differing from the first focal length region. Furthermore, in the specified focal length region, the fourth lens unit G4 can be fixed relative to the image surface, or move to the object side. It is preferable that movement of each lens unit in zooming is suitably determined according to the performance of the aimed zoom lens system.

Conditions are described below that are to be satisfied by a zoom lens system that, in order from the object side to the image side, comprises: a first lens unit having positive optical power; a second lens unit having negative optical power; and a subsequent lens unit including at least one lens unit having positive optical power, wherein a reflective optical element having a reflecting surface is included in the second lens unit, as in the zoom lens system according to Embodiments 6 to 12. Here, a plurality of conditions to be satisfied is set forth for the zoom lens system according to each embodiment. The construction that satisfies all the conditions is most desirable for the zoom lens system.

However, when an individual condition is satisfied, a zoom lens system providing the corresponding effect can be obtained.

For example, in a zoom lens system, in order from the object side to the image side, comprising: a first lens unit having positive optical power; a second lens unit having negative optical power; and a subsequent lens unit including at least one lens unit having positive optical power, wherein a reflective optical element having a reflecting surface is included in the second lens unit, as in the zoom lens system according to Embodiments 6 to 12, the following condition (1) is satisfied;

$$-5.70 < f_1/f_2 < -2.00 \tag{1}$$

(here, $Z = f_T/f_W > 5.0$)

where, $f_1$ is the composite focal length of the first lens unit, $f_2$ is the composite focal length of the second lens unit, $f_W$ is the focal length of the entire zoom lens system at the wide-angle limit, $f_T$ is the focal length of the entire zoom lens system at the telephoto limit, and Z is the magnification variation ratio.

The condition (1) sets forth the focal length ratio of the first lens unit and the second lens unit. When the value exceeds the upper limit of the condition (1), the necessary effective diameter becomes large in the second lens unit. This causes a size increase in the entire zoom lens system. In contrast, when the value goes below the lower limit of the condition (1), aberration generated in the second lens unit becomes excessive, and hence causes difficulty in sufficiently compensating aberration in the entire zoom lens system.

Here, it is preferable that the following condition (1a) is satisfied. And it is more preferable that the following condition (1b) is satisfied.

$$-5.00 < f_1/f_2 < -2.00 \tag{1a}$$

$$-4.50 < f_1/f_2 < -2.00 \tag{1b}$$

(here, $Z = f_T/f_W > 5.0$)

The condition (1a) sets forth a more preferable range within the range set forth by the condition (1). The condition (1b) sets forth a still more preferable range within the range set forth by the condition (1). When the condition (1a) is satisfied, and when the condition (1b) is satisfied further, the composite focal length of the first lens unit becomes smaller. This reduces the amount of movement of the first lens unit in zooming from the wide-angle limit to the telephoto limit.

For example, in a zoom lens system, in order from the object side to the image side, comprising: a first lens unit having positive optical power; a second lens unit having negative optical power; and a subsequent lens unit including at least one lens unit having positive optical power, wherein a reflective optical element having a reflecting surface is included in the second lens unit, as in the zoom lens system according to Embodiments 6 to 12, it is preferable that the following condition (2) is satisfied;

$$0.50 < \Sigma D/\Sigma d_{AIR} < 1.00 \tag{2}$$

where, $\Sigma D$ is an optical axial total thickness of the second lens unit and the subsequent lens unit, and $\Sigma d_{AIR}$ is an optical axial total air space that is located on the image side relative to the second lens unit and that varies in zooming.

The condition (2) relates to the thickness of the imaging device in the accommodated state. When the value exceeds the upper limit of the condition (2), the escaped optical element becomes large, and hence causes a tendency of increase in the size of the imaging device. In contrast, when the value goes below the lower limit of the condition (2), difficulty arises in sufficiently compensating aberration in the entire zoom lens system.

It is more preferable that the following condition (2a) is satisfied;

$$0.75 < \Sigma D/\Sigma d_{AIR} < 1.00 \tag{2a}$$

The condition (2a) sets forth a more preferable range within the range set forth by the condition (2). When the condition (2a) is satisfied, the optical axial total air space that varies in zooming on the image side relative to the second lens unit becomes smaller. This allows the entire zoom lens system to be more compact.

For example, in a zoom lens system, in order from the object side to the image side, comprising: a first lens unit having positive optical power; a second lens unit having negative optical power; and a subsequent lens unit including at least one lens unit having positive optical power, wherein a reflective optical element having a reflecting surface is included in the second lens unit, as in the zoom lens system according to Embodiments 6 to 12, it is preferable that the following condition (3) is satisfied;

$$0.00 < D_P/I_V < 3.00 \tag{3}$$

where, $D_P$ is a thickness of the reflective optical element in the optical axis direction, $I_V$ is a length of the image sensor in the short side direction, (here, $I_V = 2 \times f \times \tan \omega \times 0.60$)

f is a focal length of the entire zoom lens system, and

ω is an incident half view angle.

The condition (3) relates to the thickness of the reflective optical element. When the value exceeds the upper limit of the condition (3), the thickness of the reflective optical element becomes large, and hence causes a tendency of increase in the size of the imaging device. In contrast, when the value goes below the lower limit of the condition (3), a concern of difficulty arises in ensuring a sufficient thickness of the reflective optical element.

It is more preferable that the following condition (3a) is satisfied;

$$2.50 < D_P/I_V < 3.00 \tag{3a}$$

The condition (3a) sets forth a more preferable range within the range set forth by the condition (3). When the condition (3a) is satisfied, more desirable aberration compensation is achieved in the entire zoom lens system.

For example, when a zoom lens system, in order from the object side to the image side, comprising: a first lens unit having positive optical power; a second lens unit having negative optical power; and a subsequent lens unit including at least one lens unit having positive optical power, wherein a reflective optical element having a reflecting surface is included in the second lens unit, as in the zoom lens system according to Embodiments 6 to 12, is applied to an imaging device in which in the accommodated state, part of the optical elements located on the object side relative to the reflective optical element is escaped from the position in the imaging state, as in the imaging device according to Embodiments 1, 3 and 5, the zoom lens system is preferred to satisfy the following condition (4);

$$1.00 < D_1/I_V < 2.00 \quad (4)$$

where, $D_1$ is a total of the optical axial distance from the most object side surface to the most image side surface of the first lens unit and the optical axis distance from the object side surface to the image side surface of the negative meniscus lens element included in the second lens unit, $I_V$ is the length of the image sensor in the short side direction, (here, $I_V = 2 \times f \times \tan \omega \times 0.60$)

f is the focal length of the entire zoom lens system, and ω is the incident half view angle.

The condition (4) relates to the thickness of the imaging device in the accommodated state. When the value exceeds the upper limit of the condition (4), the optical element arranged on the object side becomes larger than the escaped optical element. This causes a tendency that the imaging device becomes large in the thickness direction. In contrast, when the value goes below the lower limit of the condition (4), a concern arises that aberration fluctuation could become large in the entire zoom lens system.

When the following condition (4a) or (4b) is satisfied, the above effect is achieved more successfully.

$$1.50 < D_1/I_V < 2.00 \quad (4a)$$

$$1.00 < D_1/I_V < 1.30 \quad (4b)$$

For example, when a zoom lens system, in order from the object side to the image side, comprising: a first lens unit having positive optical power; a second lens unit having negative optical power; and a subsequent lens unit including at least one lens unit having positive optical power, wherein a reflective optical element having a reflecting surface is included in the second lens unit, as in the zoom lens system according to Embodiments 6 to 12, is applied to an imaging device in which in the accommodated state, part of the optical elements located on the object side relative to the reflective optical element is escaped from the position in the imaging state, as in the imaging device according to Embodiments 1, 3 and 5, the zoom lens system is preferred to satisfy the following condition (5);

$$0.30 < D_1/D_P < 0.70 \quad (5)$$

where, $D_1$ is the total of the optical axial distance from the most object side surface to the most image side surface of the first lens unit and the optical axis distance from the object side surface to the image side surface of the negative meniscus lens element included in the second lens unit, and $D_P$ is the thickness of the reflective optical element in the optical axis direction.

The condition (5) relates to the thickness of the imaging device in the accommodated state. When the value exceeds the upper limit of the condition (5), in comparison with the thickness of the reflective optical element, the optical element arranged on the object side becomes larger than the escaped optical element. This causes a tendency that the imaging device becomes large in the thickness direction. In contrast, when the value goes below the lower limit of the condition (5), a concern arises that aberration fluctuation could become large in the entire zoom lens system.

When the following condition (5a) or (5b) is satisfied, the above effect is achieved more successfully.

$$0.52 < D_1/D_P < 0.70 \quad (5a)$$

$$0.30 < D_1/D_P < 0.45 \quad (5b)$$

For example, when a zoom lens system, in order from the object side to the image side, comprising: a first lens unit having positive optical power; a second lens unit having negative optical power; and a subsequent lens unit including at least one lens unit having positive optical power, wherein a reflective optical element having a reflecting surface is included in the second lens unit, as in the zoom lens system according to Embodiments 6 to 12, is applied to an imaging device in which in the accommodated state, the entire optical elements located on the object side relative to the reflective optical element are escaped from the position in the imaging state, as in the imaging device according to Embodiments 2 and 4, the zoom lens system is preferred to satisfy the following condition (6);

$$0.80 < D_1'/I_V < 1.90 \quad (6)$$

where, $D_1'$ is an optical axis distance from the most object side surface to the most image side surface of the first lens unit, $I_V$ is the length of the image sensor in the short side direction, (here, $I_V = 2 \times f \times \tan \omega \times 0.60$)

f is the focal length of the entire zoom lens system, and ω is the incident half view angle.

The condition (6) relates to the thickness of the imaging device in the accommodated state. When the value exceeds the upper limit of the condition (6), the optical element arranged on the object side becomes larger than the escaped optical element. This causes a tendency that the imaging device becomes large in the thickness direction. In contrast, when the value goes below the lower limit of the condition (6), a concern arises that aberration fluctuation could become large in the entire zoom lens system.

When the following condition (6a) or (6b) is satisfied, the above effect is achieved more successfully.

$$1.45 < D_1'/I_V < 1.90 \quad (6a)$$

$$0.80 < D_1'/I_V < 1.40 \quad (6b)$$

For example, when a zoom lens system, in order from the object side to the image side, comprising: a first lens unit having positive optical power; a second lens unit having negative optical power; and a subsequent lens unit including at least one lens unit having positive optical power, wherein a reflective optical element having a reflecting surface is included in the second lens unit, as in the zoom lens system according to Embodiments 6 to 12, is applied to an imaging device in which in the accommodated state, the entire optical elements located on the object side relative to the reflective optical element are escaped from the position in the imaging state, as in the imaging device according to Embodiments 2 and 4, the zoom lens system is preferred to satisfy the following condition (7);

$$0.20 < D_1'/D_P < 0.60 \quad (7)$$

where, $D_1'$ is the optical axis distance from the most object side surface to the most image side surface of the first lens unit, and $D_P$ is the thickness of the reflective optical element in the optical axis direction.

The condition (7) relates to the thickness of the imaging device in the accommodated state. When the value exceeds the upper limit of the condition (7), in comparison with the thickness of the reflective optical element, the optical element arranged on the object side becomes larger than the escaped optical element. This causes a tendency that the imaging device becomes large in the thickness direction. In contrast, when the value goes below the lower limit of the condition (7), a concern arises that aberration fluctuation could become large in the entire zoom lens system.

When the following condition (7a) or (7b) is satisfied, the above effect is achieved more successfully.

$$0.41 < D_1'/D_P < 0.60 \tag{7a}$$

$$0.20 < D_1'/D_P < 0.36 \tag{7b}$$

For example, in a zoom lens system, in order from the object side to the image side, comprising: a first lens unit having positive optical power; a second lens unit having negative optical power; and a subsequent lens unit including at least one lens unit having positive optical power, wherein a reflective optical element having a reflecting surface is included in the second lens unit, as in the zoom lens system according to Embodiments 6 to 12, it is preferable that the following condition (8) is satisfied;

$$3.00 < M_1/I_V < 4.60 \tag{8}$$

where, $M_1$ is an amount of movement of the first lens unit in zooming from the wide-angle limit to the telephoto limit, $I_V$ is the length of the image sensor in the short side direction, (here, $I_V = 2 \times f \times \tan \omega \times 0.60$)

f is the focal length of the entire zoom lens system, and ω is the incident half view angle.

The condition (8) sets forth the amount of movement of the first lens unit, and hence determines the thickness of the imaging device in the imaging state. When the value exceeds the upper limit of the condition (8), the amount of movement of the first lens unit increases, and so does the optical overall length at the telephoto limit. This causes a tendency that the imaging device becomes large in the thickness direction. In contrast, when the value goes below the lower limit of the condition (8), a concern arises that aberration fluctuation could become large in the entire zoom lens system.

When the following condition (8a) or (8b) is satisfied, the above effect is achieved more successfully.

$$4.00 < M_1/I_V < 4.60 \tag{8a}$$

$$3.00 < M_1/I_V < 3.85 \tag{8b}$$

For example, in a zoom lens system, in order from the object side to the image side, comprising: a first lens unit having positive optical power; a second lens unit having negative optical power; and a subsequent lens unit including at least one lens unit having positive optical power, wherein a reflective optical element having a reflecting surface is included in the second lens unit and wherein the subsequent lens unit, in order from the object side to the image side, comprise a third lens unit having positive optical power and a fourth lens unit having positive optical power, as in the zoom lens system according to Embodiments 6 to 12, it is preferable that the following condition (9) is satisfied;

$$2.00 < f_4/f_W < 3.70 \tag{9}$$

(here, $Z = f_T/f_W > 5.0$)

where, $f_4$ is a composite focal length of the fourth lens unit, $f_W$ is the focal length of the entire zoom lens system at the wide-angle limit, $f_T$ is the focal length of the entire zoom lens system at the telephoto limit, and Z is the magnification variation ratio.

The condition (9) sets forth the focal length of the fourth lens unit. When the value exceeds the upper limit of the condition (9), a tendency arises that the amount of movement at the time of focusing becomes large. In contrast, when the value goes below the lower limit of the condition (9), aberration generated in the fourth lens unit becomes excessive, and hence causes a concern of difficulty in compensating coma aberration generated in the entire zoom lens system.

It is more preferable that the following condition (9a) is satisfied;

$$2.00 < f_4/f_W < 3.00 \tag{9a}$$

(here, $Z = f_T/f_W > 5.0$)

The condition (9a) sets forth a more preferable range within the range set forth by the condition (9). When the condition (9a) is satisfied, the composite focal length of the fourth lens unit becomes smaller, so that the amount of movement at the time of focusing can be reduced.

For example, in a zoom lens system, in order from the object side to the image side, comprising: a first lens unit having positive optical power; a second lens unit having negative optical power; and a subsequent lens unit including at least one lens unit having positive optical power, wherein a reflective optical element having a reflecting surface is included in the second lens unit and wherein the subsequent lens unit, in order from the object side to the image side, comprise a third lens unit having positive optical power and a fourth lens unit having positive optical power, as in the zoom lens system according to Embodiments 6 to 12, it is preferable that the following condition (10) is satisfied;

$$-3.00 < f_2/f_W < -2.00 \tag{10}$$

(here, $Z = f_T/f_W > 5.0$)

where, $f_2$ is the composite focal length of the second lens unit, $f_W$ is the focal length of the entire zoom lens system at the wide-angle limit, $f_T$ is the focal length of the entire zoom lens system at the telephoto limit, and Z is the magnification variation ratio.

The condition (10) relates to the error sensitivity of the second lens unit that moves when the imaging device transits from the imaging state to the accommodated state. When the value exceeds the upper limit of the condition (10), aberration generated in the second lens unit becomes excessive, and hence causes a concern of difficulty in compensating coma aberration generated in the entire zoom lens system. In contrast, when the value goes below the lower limit of the condition (10), the necessary effective diameter becomes large in the second lens unit. This causes a tendency of size increase in the entire zoom lens system.

When the following condition (10a) is satisfied, the above effect is achieved more successfully.

$$-2.40 < f_2/f_W < -2.00 \tag{10a}$$

(here, $Z = f_T/f_W > 5.0$)

The Embodiments 6 to 12 have been described for the case of a zoom lens system of four units having a construction of positive, negative, positive and positive, in order from the object side to the image side, comprising: a first lens unit having positive optical power; a second lens unit having negative optical power; a third lens unit having positive optical power; and a fourth lens unit having positive optical power. However, the invention is not limited to the zoom lens system of this construction. For example, the employed construction may be a five-unit construction of positive, negative, positive, positive and positive or alternatively positive, negative, positive, negative and positive; or alternatively a three-unit construction of positive, negative and positive. That is, as long as comprising, in order from the object side to the image side, a first lens unit having positive optical power, a second lens unit having negative optical power and a subsequent lens unit including at least one lens unit having positive optical power, any zoom lens system may be applied to the lens barrel or the imaging device according to Embodiments 1 to 5.

Here, the zoom lens system according to Embodiments 6 to 12 is composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the zoom lens system may include diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Further, Embodiments 6 to 12 have been described for the construction that a plane parallel plate P provided with an optical low-pass filter is arranged between the most image side surface of the zoom lens system and the image sensor (image surface S). This low-pass filter may be a birefringent type low-pass filter made of, for example, a crystal whose predetermined crystal orientation is adjusted; or a phase type low-pass filter that achieves required characteristics of optical cut-off frequency by diffraction. Alternatively, in each embodiment, the low-pass filter may be omitted depending on the characteristics of the image sensor for receiving the optical image in the zoom lens system.

Further, an imaging device comprising a zoom lens system according to Embodiments 6 to 12 and an image sensor such as a CCD or a CMOS may be applied to a mobile telephone, a PDA (Personal Digital Assistance), a surveillance camera in a surveillance system, a Web camera, a vehicle-mounted camera or the like.

Further, the zoom lens system according to Embodiments 6 to 12 is applicable also to a digital video camera for moving images, as well as a digital still camera. In this case, moving images with high resolution can be acquired in addition to still images.

The zoom lens systems of Embodiments 6 to 12 are described below in further detail with reference to specific examples. In the examples, the units of the length in the tables are all "mm". Further, in each example, r is the radius of curvature of each lens element, d is the axial distance, $n_d$ is the refractive index of each lens element to the d-line, and $v_d$ is the Abbe number of each lens element to the d-line. In each example, the surfaces marked with * are aspherical surfaces, and the aspherical surface configuration is defined by the following expression:

$$Z = \frac{\frac{h^2}{r}}{1 + \sqrt{1 - (1+\kappa)\left(\frac{h}{r}\right)^2}} + Dh^4 + Eh^6 + Fh^8 + Gh^{10}$$

Here, h is the height from the optical axis, Z is the distance (sag) of the point on the aspherical surface of the height h from the optical axis which is measured from the tangential plane of the aspherical surface vertex, r is the radius of curvature of the aspherical surface vertex, κ is the conic constant, D, E, F and G are a fourth-order, sixth-order, eighth-order and tenth-order aspherical coefficients, respectively.

FIGS. 18A to 18I are longitudinal aberration diagrams of a zoom lens system according to Example 1. FIGS. 19A to 19I are longitudinal aberration diagrams of a zoom lens system according to Example 2. FIGS. 20A to 20I are longitudinal aberration diagrams of a zoom lens system according to Example 3. FIGS. 21A to 21I are longitudinal aberration diagrams of a zoom lens system according to Example 4. FIGS. 22A to 22I are longitudinal aberration diagrams of a zoom lens system according to Example 5. FIGS. 23A to 23I are longitudinal aberration diagrams of a zoom lens system according to Example 6. FIGS. 24A to 24I are longitudinal aberration diagrams of a zoom lens system according to Example 7.

FIGS. 18A to 18C, FIGS. 19A to 19C, FIGS. 20A to 20C, FIGS. 21A to 21C, FIGS. 22A to 22C, FIGS. 23A to 23C and FIGS. 24A to 24C show the aberration at the wide-angle limit. FIGS. 18D to 18F, FIGS. 19D to 19F, FIGS. 20D to 20F, FIGS. 21D to 21F, FIGS. 22D to 22F, FIGS. 23D to 23F and FIGS. 24D to 24F show the aberration at the middle position. FIGS. 18G to 18I, FIGS. 19G to 19I, FIGS. 20G to 20I, FIGS. 21G to 21I, FIGS. 22G to 22I, FIGS. 23G to 23I and FIGS. 24G to 24I show the aberration at the telephoto limit. FIGS. 18A, 18D, 18G, 19A, 19D, 19G, 20A, 20D, 20G, 21A, 21D, 21G, 22A, 22D, 22G, 23A, 23D, 23G, 24A, 24D and 24G are spherical aberration diagrams. FIGS. 18B, 18E, 18H, 19B, 19E, 19H, 20B, 20E, 20H, 21B, 21E, 21H, 22B, 22E, 22H, 23B, 23E, 23H, 24B, 24E and 24H are astigmatism diagrams. FIGS. 18C, 18F, 18I, 19C, 19F, 19I, 20C, 20F, 20I, 21C, 21F, 21I, 22C, 22F, 22I, 23C, 23F, 23I, 24C, 24F and 24I are distortion diagrams. In each spherical aberration diagram, the vertical axis indicates the F-number, and the solid line, the short dash line and the long dash line indicate the characteristics to the d-line, the F-line and the C-line, respectively. In each astigmatism diagram, the vertical axis indicates the incident half view angle, and the solid line and the dash line indicate the characteristics to the sagittal image plane (in each Fig., indicated as "s") and the meridional image plane (in each Fig., indicated as "m"), respectively. In each distortion diagram, the vertical axis indicates the incident half view angle. As seen from the longitudinal aberration diagrams of FIGS. 18A to 18I, FIGS. 19A to 19I, FIGS. 20A to 20I, FIGS. 21A to 21I, FIGS. 22A to 22I, FIGS. 23A to 23I and FIGS. 24A to 24I, the zoom lens systems of Examples 1 to 7 have sufficient aberration compensation capability for realizing a high resolution.

EXAMPLE 1

The zoom lens system of Example 1 corresponds to the zoom lens system of Embodiment 6 shown in FIGS. 11A to 11C. Table 1 shows the lens data of the zoom lens system of Example 1. Table 2 shows the a spherical data. Table 3 shows the focal length, the F-number, the incident half view angle (°), and the variable axial distance data, when the shooting distance is ∞. Here, "E+00" and the like denote "×10$^{+00}$" and the like in Table 2.

TABLE 1

| Lens unit | Lens element | Surface | Radius of curvature (r) | Axial distance (d) | Refractive index ($n_d$) | Abbe number ($v_d$) |
|---|---|---|---|---|---|---|
| G1 | L1 | 1 | r1 = 28.812 | d1 = 1.000 | n1 = 1.84666 | v1 = 23.8 |
|  | L2 | 2 | r2 = 21.133 | d2 = 4.500 | n2 = 1.72916 | v2 = 54.7 |
|  |  | 3 | r3 = −650.217 | d3 = Variable |  |  |
| G2 | L3 | 4 | r4 = 98.473 | d4 = 1.000 | n3 = 1.83400 | v3 = 37.3 |
|  |  | 5 | r5 = 8.147 | d5 = 3.605 |  |  |
|  | PR | 6 | r6 = ∞ | d6 = 11.000 | n4 = 1.58913 | v4 = 61.3 |
|  |  | 7 | r7 = ∞ | d7 = 0.622 |  |  |
|  | L4 | 8 | r8 = −36.043 | d8 = 0.800 | n5 = 1.80431 | v5 = 40.9 |
|  |  | 9* | r9 = 32.744 | d9 = 0.792 |  |  |
|  | L5 | 10 | r10 = 48.799 | d10 = 2.300 | n6 = 1.84666 | v6 = 23.8 |
|  |  | 11 | r11 = −27.944 | d11 = Variable |  |  |
| Diaphragm |  | 12 | r12 = ∞ | d12 = 0.900 |  |  |
| G3 | L6 | 13 | r13 = 7.106 | d13 = 1.800 | n7 = 1.72916 | v7 = 54.7 |
|  |  | 14 | r14 = 23.356 | d14 = 1.619 |  |  |
|  | L7 | 15* | r15 = 7.781 | d15 = 1.900 | n8 = 1.66556 | v8 = 54.8 |
|  | L8 | 16 | r16 = 18.312 | d16 = 0.700 | n9 = 1.84666 | v9 = 23.8 |
|  |  | 17 | r17 = 4.739 | d17 = Variable |  |  |
| G4 | L9 | 18* | r18 = 9.273 | d18 = 2.511 | n10 = 1.66556 | v10 = 54.8 |
|  | L10 | 19 | r19 = −19.462 | d19 = 0.800 | n11 = 1.75520 | v11 = 27.5 |
|  |  | 20 | r20 = 831.065 | d20 = Variable |  |  |
|  | P | 21 | r21 = ∞ | d21 = 2.100 | n12 = 1.51680 | v12 = 64.2 |
|  |  | 22 | r22 = ∞ | d22 = 1.090 |  |  |

TABLE 2

| Surface | κ | D | E | F | G |
|---|---|---|---|---|---|
| 9* | 0.00000E+00 | −6.59047E−05 | −1.56001E−08 | −8.73197E−09 | 1.69979E−10 |
| 15* | 0.00000E+00 | −3.88813E−04 | −2.93512E−05 | 3.49973E−06 | −2.64729E−07 |
| 18* | 0.00000E+00 | 5.29654E−05 | 4.52652E−06 | −3.72245E−07 | 8.251E−09 |

TABLE 3

|  |  | Wide-angle limit | Middle position | Telephoto limit |
|---|---|---|---|---|
| Focal length |  | 5.62 | 13.76 | 33.73 |
| F-number |  | 2.84 | 4.01 | 6.21 |
| Incident half view angle |  | 30.53 | 12.84 | 5.32 |
| Variable axial distance | d3 | 0.800 | 9.500 | 13.926 |
|  | d11 | 22.698 | 12.775 | 1.400 |
|  | d17 | 2.781 | 14.213 | 27.463 |
|  | d20 | 4.557 | 3.034 | 1.179 |

EXAMPLE 2

The zoom lens system of Example 2 corresponds to the zoom lens system of Embodiment 7 shown in FIGS. 12A to 12C. Table 4 shows the lens data of the zoom lens system of Example 2. Table shows the a spherical data. Table 6 shows the focal length, the F-number, the incident half view angle (°), and the variable axial distance data, when the shooting distance is ∞. Here, "E+00" and the like denote "×10$^{+00}$" and the like in Table 5.

TABLE 4

| Lens unit | Lens element | Surface | Radius of curvature (r) | Axial distance (d) | Refractive index ($n_d$) | Abbe number ($v_d$) |
|---|---|---|---|---|---|---|
| G1 | L1 | 1 | r1 = 29.995 | d1 = 1.000 | n1 = 1.84666 | v1 = 23.8 |
| | L2 | 2 | r2 = 23.738 | d2 = 3.967 | n2 = 1.72916 | v2 = 54.7 |
| | | 3 | r3 = −2024.630 | d3 = Variable | | |
| G2 | L3 | 4 | r4 = 53.550 | d4 = 1.000 | n3 = 1.83400 | v3 = 37.3 |
| | | 5 | r5 = 7.884 | d5 = 3.831 | | |
| | PR | 6 | r6 = ∞ | d6 = 11.000 | n4 = 1.58913 | v4 = 61.3 |
| | | 7 | r7 = ∞ | d7 = 0.567 | | |
| | L4 | 8 | r8 = −40.056 | d8 = 0.800 | n5 = 1.80431 | v5 = 40.9 |
| | | 9* | r9 = 25.318 | d9 = 0.792 | | |
| | L5 | 10 | r10 = 38.218 | d10 = 2.300 | n6 = 1.84666 | v6 = 23.8 |
| | | 11 | r11 = −28.688 | d11 = Variable | | |
| Diaphragm | | 12 | r12 = ∞ | d12 = 0.900 | | |
| G3 | L6 | 13 | r13 = 7.810 | d13 = 1.800 | n7 = 1.72916 | v7 = 54.7 |
| | | 14 | r14 = 32.945 | d14 = 1.619 | | |
| | L7 | 15* | r15 = 7.742 | d15 = 1.900 | n8 = 1.66556 | v8 = 54.8 |
| | L8 | 16 | r16 = 27.399 | d16 = 0.700 | n9 = 1.84666 | v9 = 23.8 |
| | | 17 | r17 = 4.897 | d17 = Variable | | |
| G4 | L9 | 18* | r18 = 8.594 | d18 = 1.843 | n10 = 1.66556 | v10 = 54.8 |
| | | 19 | r19 = 56.308 | d19 = Variable | | |
| | P | 20 | r20 = ∞ | d20 = 2.100 | n11 = 1.51680 | v11 = 64.2 |
| | | 21 | r21 = ∞ | d21 = 1.090 | | |

TABLE 5

| Surface | κ | D | E | F | G |
|---|---|---|---|---|---|
| 9* | 0.00000E+00 | −6.66124D−05 | −2.07034D−07 | 3.07175D−09 | −3.94694D−11 |
| 15* | 0.00000E+00 | −2.95682D−04 | −3.05116D−06 | −1.21930D−06 | 7.01616D−08 |
| 18* | 0.00000E+00 | 3.68010D−05 | 2.68900D−06 | −2.58975D−07 | 5.64263D−09 |

TABLE 6

| | | Wide-angle limit | Middle position | Telephoto limit |
|---|---|---|---|---|
| Focal length | | 5.62 | 13.76 | 33.73 |
| F-number | | 2.89 | 4.02 | 6.15 |
| Incident half view angle | | 30.1 | 12.84 | 5.44 |
| Variable axial distance | d3 | 0.8000 | 10.500 | 15.002 |
| | d11 | 22.427 | 13.017 | 1.400 |
| | d17 | 3.485 | 14.290 | 27.585 |
| | d19 | 5.422 | 4.000 | 2.358 |

EXAMPLE 3

The zoom lens system of Example 3 corresponds to the zoom lens system of Embodiment 8 shown in FIGS. 13A to 13C. Table 7 shows the lens data of the zoom lens system of Example 3. Table 8 shows the a spherical data. Table 9 shows the focal length, the F-number, the incident half view angle (°), and the variable axial distance data, when the shooting distance is ∞. Here, "E+00" and the like denote "×10$^{+00}$" and the like in Table 8.

TABLE 7

| Lens unit | Lens element | Surface | Radius of curvature (r) | Axial distance (d) | Refractive index ($n_d$) | Abbe number ($v_d$) |
|---|---|---|---|---|---|---|
| G1 | L1 | 1 | r1 = 28.429 | d1 = 1.000 | n1 = 1.84666 | v1 = 23.8 |
| | L2 | 2 | r2 = 20.709 | d2 = 4.435 | n2 = 1.72916 | v2 = 54.7 |
| | | 3 | r3 = 2371.774 | d3 = Variable | | |
| G2 | L3 | 4 | r4 = 51.399 | d4 = 1.000 | n3 = 1.83400 | v3 = 37.3 |
| | | 5 | r5 = 7.772 | d5 = 3.848 | | |
| | PR | 6 | r6 = ∞ | d6 = 11.000 | n4 = 1.58913 | v4 = 61.3 |
| | | 7 | r7 = ∞ | d7 = 0.249 | | |
| | L4 | 8 | r8 = −67.228 | d8 = 0.800 | n5 = 1.80431 | v5 = 40.9 |
| | | 9* | r9 = 24.572 | d9 = 0.792 | | |
| | L5 | 10 | r10 = 26.901 | d10 = 2.300 | n6 = 1.84666 | v6 = 23.8 |
| | | 11 | r11 = −58.744 | d11 = Variable | | |
| Diaphragm | | 12 | r12 = ∞ | d12 = 0.900 | | |

TABLE 7-continued

| Lens unit | Lens element | Surface | Radius of curvature (r) | Axial distance (d) | Refractive index ($n_d$) | Abbe number ($v_d$) |
|---|---|---|---|---|---|---|
| G3 | L6 | 13* | r13 = 6.527 | d13 = 2.916 | n7 = 1.72916 | v7 = 54.7 |
|  |  | 14 | r14 = −59.559 | d14 = 0.342 |  |  |
|  | L7 | 15 | r15 = 10.909 | d15 = 1.826 | n8 = 1.66556 | v8 = 54.8 |
|  |  | 16 | r16 = 4.638 | d16 = Variable |  |  |
| G4 | L8 | 17* | r17 = 8.592 | d17 = 2.785 | n9 = 1.84666 | v9 = 23.8 |
|  | L9 | 18 | r18 = −23.381 | d18 = 0.800 | n10 = 1.66556 | v10 = 54.8 |
|  |  | 19 | r19 = 39.794 | d19 = Variable |  |  |
|  | P | 20 | r20 = ∞ | d20 = 2.100 | n11 = 1.51680 | v11 = 64.2 |
|  |  | 21 | r21 = ∞ | d21 = 1.090 |  |  |

TABLE 8

| Surface | κ | D | E | F | G |
|---|---|---|---|---|---|
| 9* | 0.00000E+00 | −6.05079E−05 | 9.45244E−07 | −5.09210E−08 | 6.90314E−10 |
| 13* | 0.00000E+00 | −3.43789E−04 | −4.94020E−06 | −8.17221E−08 | −2.10541E−09 |
| 17* | 0.00000E+00 | 7.45042E−05 | 7.42367E−07 | −8.51490E−08 | 2.77419E−09 |

TABLE 9

|  |  | Wide-angle limit | Middle position | Telephoto limit |
|---|---|---|---|---|
| Focal length |  | 5.62 | 13.76 | 33.73 |
| F-number |  | 2.87 | 4.09 | 5.73 |
| Incident half view angle |  | 30.27 | 13.45 | 5.46 |
| Variable axial distance | d3 | 0.800 | 8.500 | 15.000 |
|  | d11 | 23.705 | 11.665 | 1.400 |
|  | d16 | 1.500 | 14.818 | 27.260 |
|  | d19 | 5.627 | 4.206 | 2.236 |

EXAMPLE 4

The zoom lens system of Example 4 corresponds to the zoom lens system of Embodiment 9 shown in FIGS. 14A to 14C. Table 10 shows the lens data of the zoom lens system of Example 4. Table 11 shows the a spherical data. Table 12 shows the focal length, the F-number, the incident half view angle (°), and the variable axial distance data, when the shooting distance is ∞. Here, "E+00" and the like denote "×10$^{+00}$" and the like in Table 11.

TABLE 10

| Lens unit | Lens element | Surface | Radius of curvature (r) | Axial distance (d) | Refractive index ($n_d$) | Abbe number ($v_d$) |
|---|---|---|---|---|---|---|
| G1 | L1 | 1 | r1 = 25.621 | d1 = 3.877 | n1 = 1.72916 | v1 = 54.7 |
|  |  | 2 | r2 = 384.515 | d2 = Variable |  |  |
| G2 | L2 | 3 | r3 = 56.217 | d3 = 1.000 | n2 = 1.83400 | v2 = 37.3 |
|  |  | 4 | r4 = 8.171 | d4 = 3.583 |  |  |
|  | PR | 5 | r5 = ∞ | d5 = 11.000 | n3 = 1.58913 | v3 = 61.3 |
|  |  | 6 | r6 = ∞ | d6 = 0.210 |  |  |
|  | L3 | 7 | r7 = −101.685 | d7 = 0.800 | n4 = 1.80431 | v4 = 40.9 |
|  |  | 8* | r8 = 13.957 | d8 = 0.792 |  |  |
|  | L4 | 9 | r9 = 18.602 | d9 = 2.300 | n5 = 1.84666 | v5 = 23.8 |
|  |  | 10 | r10 = −50.347 | d10 = Variable |  |  |
|  | Diaphragm | 11 | r11 = ∞ | d11 = 0.900 |  |  |
| G3 | L5 | 12 | r12 = 7.266 | d12 = 1.800 | n6 = 1.72916 | v6 = 54.7 |
|  |  | 13 | r13 = 35.329 | d13 = 1.619 |  |  |
|  | L6 | 14* | r14 = 8.909 | d14 = 1.900 | n7 = 1.66556 | v7 = 54.8 |
|  | L7 | 15 | r15 = −73.136 | d15 = 0.700 | n8 = 1.84666 | v8 = 23.8 |
|  |  | 16 | r16 = 5.16 | d16 = Variable |  |  |
| G4 | L8 | 17* | r17 = 8.538 | d17 = 0.781 | n9 = 1.66556 | v9 = 54.8 |
|  | L9 | 18 | r18 = 8.449 | d18 = 2.164 | n10 = 1.75520 | v10 = 27.5 |
|  |  | 19 | r19 = 40.202 | d19 = Variable |  |  |
|  | P | 20 | r20 = ∞ | d20 = 2.100 | n11 = 1.51680 | v11 = 64.2 |
|  |  | 21 | r21 = ∞ | d21 = 1.090 |  |  |

TABLE 11

| Surface | κ | D | E | F | G |
|---|---|---|---|---|---|
| 8* | 0.00000E+00 | −9.60135E−05 | 6.45377E−07 | −4.14325E−08 | 5.74762E−10 |
| 14* | 0.00000E+00 | −3.73524E−04 | −2.61371E−05 | 2.77003E−06 | −1.92260E−07 |
| 17* | 0.00000E+00 | −2.11806E−05 | 3.65834E−06 | −2.23865E−07 | 3.85937E−09 |

TABLE 12

|  |  | Wide-angle limit | Middle position | Telephoto limit |
|---|---|---|---|---|
| Focal length |  | 5.62 | 13.76 | 33.73 |
| F-number |  | 2.88 | 3.87 | 5.70 |
| Incident half view angle |  | 30.14 | 12.84 | 5.50 |
| Variable axial distance | d2 | 0.800 | 9.500 | 13.185 |
|  | d10 | 23.223 | 14.141 | 1.400 |
|  | d16 | 3.190 | 13.314 | 27.079 |
|  | d19 | 4.435 | 3.333 | 2.399 |

TABLE 15

|  |  | Wide-angle limit | Middle position | Telephoto limit |
|---|---|---|---|---|
| Focal length |  | 5.62 | 13.76 | 33.73 |
| F-number |  | 2.93 | 3.92 | 5.61 |
| Incident half view angle |  | 30.13 | 13.08 | 5.53 |
| Variable axial distance | d3 | 0.700 | 9.500 | 14.106 |
|  | d11 | 23.359 | 12.961 | 1.300 |
|  | d16 | 1.000 | 12.957 | 26.786 |
|  | d18 | 8.077 | 6.483 | 4.370 |

EXAMPLE 5

The zoom lens system of Example 5 corresponds to the zoom lens system of Embodiment 10 shown in FIGS. 15A to 15C. Table 13 shows the lens data of the zoom lens system of Example 5. Table 14 shows the a spherical data. Table 15 shows the focal length, the F-number, the incident half view angle (°), and the variable axial distance data, when the shooting distance is ∞. Here, "E+00" and the like denote "×10$^{+00}$" and the like in Table 14.

EXAMPLE 6

The zoom lens system of Example 6 corresponds to the zoom lens system of Embodiment 11 shown in FIGS. 16A to 16C. Table 16 shows the lens data of the zoom lens system of Example 6. Table 17 shows the a spherical data. Table 18 shows the focal length, the F-number, the incident half view angle (°), and the variable axial distance data, when the shooting distance is ∞. Here, "E+00" and the like denote "×10$^{+00}$" and the like in Table 17.

TABLE 13

| Lens unit | Lens element | Surface | Radius of curvature (r) | Axial distance (d) | Refractive index ($n_d$) | Abbe number ($v_d$) |
|---|---|---|---|---|---|---|
| G1 | L1 | 1 | r1 = 25.119 | d1 = 0.800 | n1 = 1.84666 | v1 = 23.8 |
|  | L2 | 2 | r2 = 20.794 | d2 = 3.812 | n2 = 1.77250 | v2 = 49.6 |
|  |  | 3 | r3 = 144.664 | d3 = Variable |  |  |
| G2 | L3 | 4 | r4 = 36.331 | d4 = 1.000 | n3 = 1.83400 | v3 = 37.3 |
|  |  | 5 | r5 = 7.592 | d5 = 4.082 |  |  |
|  | PR | 6 | r6 = ∞ | d6 = 11.000 | n4 = 1.58913 | v4 = 61.3 |
|  |  | 7 | r7 = ∞ | d7 = 0.209 |  |  |
|  | L4 | 8* | r8 = −1000 | d8 = 1.200 | n5 = 1.60602 | v5 = 57.5 |
|  |  | 9* | r9 = 13.199 | d9 = 0.652 |  |  |
|  | L5 | 10 | r10 = 26.648 | d10 = 2.000 | n6 = 1.80518 | v6 = 25.5 |
|  |  | 11 | r11 = −53.695 | d11 = Variable |  |  |
| Diaphragm |  | 12 | r12 = ∞ | d12 = 0.900 |  |  |
| G3 | L6 | 13* | r13 = 5.362 | d13 = 2.231 | n7 = 1.66547 | v7 = 55.2 |
|  |  | 14 | r14 = 88.742 | d14 = 0.200 |  |  |
|  | L7 | 15 | r15 = 8.694 | d15 = 0.600 | n8 = 1.84666 | v8 = 23.8 |
|  |  | 16 | r16 = 4.196 | d16 = Variable |  |  |
| G4 | L8 | 17 | r17 = 9.403 | d17 = 1.935 | n9 = 1.74330 | v9 = 49.2 |
|  |  | 18 | r18 = 21.813 | d18 = Variable |  |  |
|  | P | 19 | r19 = ∞ | d19 = 2.100 | n10 = 1.51680 | v10 = 64.2 |
|  |  | 20 | r20 = ∞ | d20 = 1.090 |  |  |

TABLE 14

| Surface | κ | D | E | F | G |
|---|---|---|---|---|---|
| 8* | 0.00000E+00 | −2.45905E−04 | −7.58463E−06 | 6.89917E−07 | −9.96855E−09 |
| 9* | 0.00000E+00 | −4.05761E−04 | −7.49199E−06 | 7.45822E−07 | −1.18170E−08 |
| 13* | 0.00000E+00 | −4.48010E−04 | 2.71215E−06 | −2.11926E−06 | 7.41855E−08 |

TABLE 16

| Lens unit | Lens element | Surface | Radius of curvature (r) | Axial distance (d) | Refractive index ($n_d$) | Abbe number ($v_d$) |
|---|---|---|---|---|---|---|
| G1 | L1 | 1 | r1 = 27.946 | d1 = 1.000 | n1 = 1.84666 | v1 = 23.8 |
|  | L2 | 2 | r2 = 19.089 | d2 = 4.876 | n2 = 1.72916 | v2 = 54.7 |
|  |  | 3 | r3 = −4653.723 | d3 = Variable |  |  |
| G2 | L3 | 4 | r4 = 75.94 | d4 = 1.000 | n3 = 1.83400 | v3 = 37.3 |
|  |  | 5 | r5 = 7.891 | d5 = 3.827 |  |  |
|  | PR | 6 | r6 = ∞ | d6 = 11.000 | n4 = 1.84666 | v4 = 23.8 |
|  |  | 7 | r7 = ∞ | d7 = 0.184 |  |  |
|  | L4 | 8* | r8 = −64.776 | d8 = 0.800 | n5 = 1.80431 | v5 = 40.9 |
|  | L5 | 9 | r9 = 37.751 | d9 = 2.660 | n6 = 1.84666 | v6 = 23.8 |
|  |  | 10 | r10 = −44.505 | d10 = Variable |  |  |
| Diaphragm |  | 11 | r11 = ∞ | d11 = 0.900 |  |  |
| G3 | L6 | 12 | r12 = 6.975 | d12 = 1.800 | n7 = 1.72916 | v7 = 54.7 |
|  |  | 13 | r13 = 21.052 | d13 = 1.619 |  |  |
|  | L7 | 14* | r14 = 8.969 | d14 = 1.900 | n8 = 1.66556 | v8 = 54.8 |
|  | L8 | 15 | r15 = 11.442 | d15 = 0.700 | n9 = 1.84666 | v9 = 23.8 |
|  |  | 16 | r16 = 5.021 | d16 = Variable |  |  |
| G4 | L9 | 17* | r17 = 8.375 | d17 = 3.082 | n10 = 1.66556 | v10 = 54.8 |
|  | L10 | 18 | r18 = −12.649 | d18 = 0.800 | n11 = 1.75520 | v11 = 27.5 |
|  |  | 19 | r19 = 58.17 | d19 = Variable |  |  |
|  | P | 20 | r20 = ∞ | d20 = 2.100 | n12 = 1.51680 | v12 = 64.2 |
|  |  | 21 | r21 = ∞ | d21 = 1.090 |  |  |

TABLE 17

| Surface | κ | D | E | F | G |
|---|---|---|---|---|---|
| 8* | 0.00000E+00 | 6.51663E−05 | −1.12645E−07 | 1.47597E−08 | −7.23913E−11 |
| 14* | 0.00000E+00 | −4.13218E−04 | −2.96249E−05 | 3.32962E−06 | −2.14765E−07 |
| 17* | 0.00000E+00 | 5.95362E−05 | 1.84121E−06 | −1.00436E−07 | 1.83526E−09 |

TABLE 18

|  |  | Wide-angle limit | Middle position | Telephoto limit |
|---|---|---|---|---|
| Focal length |  | 5.62 | 13.76 | 33.73 |
| F-number |  | 2.82 | 4.31 | 6.53 |
| Incident half view angle |  | 30.08 | 11.89 | 3.99 |
| Variable axial distance | d3 | 0.800 | 9.065 | 16.000 |
|  | d10 | 27.000 | 12.616 | 1.400 |
|  | d16 | 1.000 | 16.863 | 30.652 |
|  | d19 | 4.808 | 3.613 | 0.770 |

EXAMPLE 7

The zoom lens system of Example 7 corresponds to the zoom lens system of Embodiment 12 shown in FIGS. 17A to 17C. Table 19 shows the lens data of the zoom lens system of Example 7. Table 20 shows the a spherical data. Table 21 shows the focal length, the F-number, the incident half view angle (°), and the variable axial distance data, when the shooting distance is ∞. Here, "E+00" and the like denote "×10$^{+00}$" and the like in Table 20.

TABLE 19

| Lens unit | Lens element | Surface | Radius of curvature (r) | Axial distance (d) | Refractive index ($n_d$) | Abbe number ($v_d$) |
|---|---|---|---|---|---|---|
| G1 | L1 | 1 | r1 = 29.512 | d1 = 1.000 | n1 = 1.84666 | v1 = 23.8 |
|  | L2 | 2 | r2 = 20.673 | d2 = 3.000 | n2 = 1.72916 | v2 = 54.7 |
|  |  | 3 | r3 = 140.864 | d3 = Variable |  |  |
| G2 | L3 | 4 | r4 = 49.146 | d4 = 1.000 | n3 = 1.80610 | v3 = 33.3 |
|  |  | 5 | r5 = 10.302 | d5 = 3.275 |  |  |
|  | L4 | 6* | r6 = −16.037 | d6 = 0.800 | n4 = 1.66547 | v4 = 55.2 |
|  |  | 7* | r7 = 9.619 | d7 = 0.792 |  |  |
|  | PR | 8 | r8 = 12.486 | d8 = 12.000 | n5 = 1.84666 | v5 = 23.8 |
|  |  | 9 | r9 = −108.091 | d9 = Variable |  |  |
| Diaphragm |  | 10 | r10 = ∞ | d10 = 0.900 |  |  |
| G3 | L5 | 11 | r11 = 8.56 | d11 = 1.800 | n6 = 1.72916 | v6 = 54.7 |
|  |  | 12 | r12 = −193.315 | d12 = 1.619 |  |  |

TABLE 19-continued

| Lens unit | Lens element | Surface | Radius of curvature (r) | Axial distance (d) | Refractive index ($n_d$) | Abbe number ($v_d$) |
|---|---|---|---|---|---|---|
| | L6 | 13* | r13 = 13.869 | d13 = 1.900 | n7 = 1.66547 | v7 = 55.2 |
| | L7 | 14 | r14 = 62.014 | d14 = 0.700 | n8 = 1.84666 | v8 = 23.8 |
| | | 15 | r15 = 7.068 | d15 = Variable | | |
| G4 | L8 | 16* | r16 = 13.979 | d16 = 2.150 | n9 = 1.80470 | v9 = 41.0 |
| | | 17 | r17 = −62.022 | d17 = Variable | | |
| | P | 18 | r18 = ∞ | d18 = 2.100 | n10 = 1.51680 | v10 = 64.2 |
| | | 19 | r19 = ∞ | d19 = 1.090 | | |

TABLE 20

| Surface | κ | D | E | F | G |
|---|---|---|---|---|---|
| 6* | 0.00000E+00 | 4.11466E−04 | −1.09522E−05 | 1.52412E−07 | −7.65363E−10 |
| 7* | 0.00000E+00 | 2.85432E−04 | −1.22246E−05 | 1.53114E−07 | −8.06130E−10 |
| 13* | 0.00000E+00 | −4.16736E−04 | −5.09898E−06 | −1.15667E−07 | −4.52151E−09 |
| 16* | 0.00000E+00 | −1.15030E−04 | 5.26868E−06 | −2.45097E−07 | 3.66752E−09 |

TABLE 21

| | | Wide-angle limit | Middle position | Telephoto limit |
|---|---|---|---|---|
| Focal length | | 5.82 | 14.27 | 35.01 |
| F-number | | 3.04 | 5.24 | 6.17 |
| Incident half view angle | | 33.08 | 13.87 | 5.65 |
| Variable axial distance | d3 | 0.800 | 0.959 | 19.765 |
| | d9 | 21.586 | 7.125 | 1.400 |
| | d15 | 9.259 | 24.792 | 30.810 |
| | d17 | 2.835 | 1.761 | 1.470 |

The following Table 22 shows the values of the conditions (1) to (10) for the zoom lens systems of Examples 1 to 7.

TABLE 22

| | | Example | | | | | | |
|---|---|---|---|---|---|---|---|---|
| | Condition | 1 | 2 | 3 | 4 | 5 | 6 | 7 |
| (1) | $f_1/f_2$ | −3.11 | −3.17 | −3.32 | −2.97 | −3.20 | −3.07 | −4.70 |
| (2) | $\Sigma D/\Sigma d_{AIR}$ | 0.98 | 0.87 | 0.93 | 0.90 | 0.77 | 0.90 | 0.77 |
| (3) | $D_P/I_V$(Wide-angle limit) | 2.76 | 2.75 | 2.75 | 2.75 | 2.75 | 2.76 | 2.64 |
| | $D_P/I_V$(Middle position) | 2.92 | 2.92 | 2.78 | 2.92 | 2.87 | 2.72 | 2.84 |
| | $D_P/I_V$(Telephoto limit) | 2.92 | 2.91 | 2.85 | 2.89 | 2.87 | 2.92 | 2.89 |
| (4) | $D_1/I_V$(Wide-angle limit) | 1.63 | 1.50 | 1.61 | 1.22 | 1.45 | 1.73 | — |
| | $D_1/I_V$(Middle position) | 1.73 | 1.59 | 1.63 | 1.30 | 1.51 | 1.70 | — |
| | $D_1/I_V$(Telephoto limit) | 1.73 | 1.58 | 1.66 | 1.28 | 1.52 | 1.83 | — |
| (5) | $D_1/D_P$ | 0.59 | 0.54 | 0.58 | 0.44 | 0.53 | 0.63 | — |
| (6) | $D_1'/I_V$(Wide-angle limit) | 1.38 | 1.24 | 1.36 | 0.97 | 1.15 | 1.48 | 0.88 |
| | $D_1'/I_V$(Middle position) | 1.46 | 1.32 | 1.37 | 1.03 | 1.20 | 1.45 | 0.95 |
| | $D_1'/I_V$(Telephoto limit) | 1.46 | 1.32 | 1.41 | 1.02 | 1.20 | 1.56 | 0.96 |
| (7) | $D_1'/D_P$ | 0.50 | 0.45 | 0.49 | 0.35 | 0.42 | 0.53 | 0.33 |
| (8) | $M_1/I_V$(Wide-angle limit) | 3.30 | 3.56 | 3.55 | 3.10 | 3.45 | 3.82 | 4.17 |
| | $M_1/I_V$(Middle position) | 3.49 | 3.77 | 3.59 | 3.29 | 3.60 | 3.76 | 4.49 |
| | $M_1/I_V$(Telephoto limit) | 3.49 | 3.76 | 3.67 | 3.26 | 3.60 | 4.04 | 4.56 |
| (9) | $f_4/f_W$ | 2.66 | 2.61 | 3.31 | 2.42 | 3.63 | 2.78 | 2.47 |
| (10) | $f_2/f_W$ | −2.29 | −2.32 | −2.21 | −2.20 | −2.15 | −2.33 | −2.01 |

The present invention realizes a zoom lens system having a magnification variation ratio of 5× or greater and a high resolution, and a compact lens barrel that has a short overall length in an accommodated state and that holds the zoom lens system. Accordingly, the lens barrel of the present invention is applicable to a digital input device such as a digital still camera, a digital video camera, a mobile telephone, a PDA (Personal Digital Assistance), a surveillance camera in a surveillance system, a Web camera or a vehicle-mounted camera, requiring thickness reduction. In particular, the present zoom lens system and the lens barrel are suitably used for a device provided with an imaging optical system requiring high image quality, such as a digital still camera or a digital video camera.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A zoom lens system, in order from the object side to the image side, comprising:
   a first lens unit having positive optical power;
   a second lens unit that includes a reflective optical element having a reflecting surface for bending a light ray from an object and that has negative optical power; and
   a subsequent lens unit including at least one lens unit having positive optical power, wherein
   the following condition (1) is satisfied:

$$-5.70 < f_1/f_2 < -2.00 \quad (1)$$

(here, $Z = f_T/f_W > 5.0$)

wherein,
   $f_1$ is the composite focal length of the first lens unit,
   $f_2$ is the composite focal length of the second lens unit,
   $f_W$ is the focal length of the entire zoom lens system at a wide-angle limit,
   $f_T$ is the focal length of the entire zoom lens system at a telephoto limit, and
   Z is the magnification variation ratio.

2. The zoom lens system as claimed in claim 1, wherein the reflecting surface of the reflective optical element bends by approximately 90° an axial principal ray from the object.

3. The zoom lens system as claimed in claim 1, wherein the reflective optical element is a prism.

4. The zoom lens system as claimed in claim 1, satisfying the following condition (2):

$$0.50 < \Sigma D / \Sigma d_{AIR} < 1.00 \quad (2)$$

wherein,
   $\Sigma D$ is the optical axial total thickness of the second lens unit and the subsequent lens unit, and
   $\Sigma d_{AIR}$ is the optical axial total air space that is located on the image side relative to the second lens unit and that varies in zooming.

5. The zoom lens system as claimed in claim 1, satisfying the following condition (3):

$$0.00 < D_P/I_V < 3.00 \quad (3)$$

wherein,
   $D_P$ is the thickness of the reflective optical element in the optical axis direction,
   $I_V$ is the length of the image sensor in the short side direction, (here, $I_V = 2 \times f \times \tan \omega \times 0.60$)

f is the focal length of the entire zoom lens system, and
   ω is the incident half view angle.

6. The zoom lens system as claimed in claim 1, satisfying the following condition (8):

$$3.00 < M_1/I_V < 4.60 \quad (8)$$

wherein,
   $M_1$ is the amount of movement of the first lens unit in zooming from the wide-angle limit to the telephoto limit,
   $I_V$ is the length of the image sensor in the short side direction, (here, $I_V = 2 \times f \times \tan \omega \times 0.60$)

f is the focal length of the entire zoom lens system, and
   ω is the incident half view angle.

7. The zoom lens system as claimed in claim 1, wherein the subsequent lens unit, in order from the object side to the image side, comprises a third lens unit having positive optical power and a fourth lens unit having positive optical power, and wherein the following condition (9) is satisfied:

$$2.00 < f_4/f_W < 3.70 \quad (9)$$

(here, $Z = f_T/f_W > 5.0$)

wherein,
   $f_4$ is the composite focal length of the fourth lens unit,
   $f_W$ is the focal length of the entire zoom lens system at the wide-angle limit,
   $f_T$ is the focal length of the entire zoom lens system at the telephoto limit, and
   Z is the magnification variation ratio.

8. The zoom lens system as claimed in claim 1, wherein the subsequent lens unit, in order from the object side to the image side, comprises a third lens unit having positive optical power and a fourth lens unit having positive optical power, and wherein the following condition (10) is satisfied:

$$-3.00 < f_2/f_W < -2.00 \quad (10)$$

(here, $Z = f_T/f_W > 5.0$)

wherein,
   $f_2$ is the composite focal length of the second lens unit,
   $f_W$ is the focal length of the entire zoom lens system at the wide-angle limit,
   $f_T$ is the focal length of the entire zoom lens system at the telephoto limit, and
   Z is the magnification variation ratio.

9. A lens barrel for holding an imaging optical system that forms an optical image of an object, wherein
   the imaging optical system is a zoom lens system that, in order from the object side to the image side, comprises:
   a first lens unit having positive optical power;
   a second lens unit that includes a reflective optical element having a reflecting surface for bending a light ray from an object and that has negative optical power; and
   a subsequent lens unit including at least one lens unit having positive optical power, and that satisfies the following condition (1):

$$-5.70 < f_1/f_2 < -2.00 \quad (1)$$

(here, $Z = f_T/f_W > 5.0$)

in which, f₁ is the composite focal length of the first lens unit,
f₂ is the composite focal length of the second lens unit,
$f_W$ is the focal length of the entire zoom lens system at a wide-angle limit,
$f_T$ is the focal length of the entire zoom lens system at a telephoto limit, and
Z is the magnification variation ratio, and wherein
in an accommodated state, the reflective optical element is escaped to a position different from a position located in an imaging state.

10. The lens barrel as claimed in claim 9, wherein in the accommodated state, at least part of the first lens unit is moved into a space where the reflective optical element is located in the imaging state.

11. The lens barrel as claimed in claim 9, wherein the reflective optical element is escaped in a direction perpendicular to the not-reflected axial principal ray from the object.

12. The lens barrel as claimed in claim 9, wherein the imaging optical system satisfies the following condition (2):

$$0.50 < \Sigma D/\Sigma d_{AIR} < 1.00 \qquad (2)$$

in which,
ΣD is the optical axial total thickness of the second lens unit and the subsequent lens unit, and
$\Sigma d_{AIR}$ is the optical axial total air space that is located on the image side relative to the second lens unit and that varies in zooming.

13. The lens barrel as claimed in claim 9, wherein the imaging optical system satisfies the following condition (3):

$$0.00 < D_P/I_V < 3.00 \qquad (3)$$

in which,
$D_P$ is the thickness of the reflective optical element in the optical axis direction,
$I_V$ is the length of the image sensor in the short side direction, (here, $I_V = 2 \times f \times \tan \omega \times 0.60$)

f is the focal length of the entire zoom lens system, and
ω is the incident half view angle.

14. The lens barrel as claimed in claim 9, wherein the second lens unit of the imaging optical system, in order from the object side to the image side, comprises: a negative meniscus lens element whose image side surface has more intense optical power; a reflective optical element; and at least one subsequent lens element.

15. The lens barrel as claimed in claim 14, wherein in the accommodated state, optical elements other than the negative meniscus lens element among the second lens unit components are escaped to a position different from a position located in the imaging state.

16. The lens barrel as claimed in claim 14, wherein in the accommodated state, the entire second lens unit is escaped to a position different from a position located in the imaging state.

17. The lens barrel as claimed in claim 9, wherein the imaging optical system satisfies the following condition (8):

$$3.00 < M_1/I_V < 4.60 \qquad (8)$$

in which,
$M_1$ is the amount of movement of the first lens unit in zooming from the wide-angle limit to the telephoto limit, $I_V$ is the length of the image sensor in the short side direction, (here, $I_V = 2 \times f \times \tan \omega \times 0.60$)

f is the focal length of the entire zoom lens system, and
ω is the incident half view angle.

18. The lens barrel as claimed in claim 9, wherein the subsequent lens unit of the imaging optical system, in order from the object side to the image side, comprises a third lens unit having positive optical power and a fourth lens unit having positive optical power, and wherein the imaging optical system satisfies the following condition (9):

$$2.00 < f_4/f_W < 3.70 \qquad (9)$$

(here, $Z = f_T/f_W > 5.0$)

in which,
f₄ is the composite focal length of the fourth lens unit,
$f_W$ is the focal length of the entire zoom lens system at the wide-angle limit,
$f_T$ is the focal length of the entire zoom lens system at the telephoto limit, and
Z is the magnification variation ratio.

19. The lens barrel as claimed in claim 9, wherein the subsequent lens unit of the imaging optical system, in order from the object side to the image side, comprises a third lens unit having positive optical power and a fourth lens unit having positive optical power, and wherein the imaging optical system satisfies the following condition (10):

$$-3.00 < f_2/f_W < -2.00 \qquad (10)$$

(here, $Z = f_T/f_W > 5.0$)

in which,
f₂ is the composite focal length of the second lens unit,
$f_W$ is the focal length of the entire zoom lens system at the wide-angle limit,
$f_T$ is the focal length of the entire zoom lens system at the telephoto limit, and
Z is the magnification variation ratio.

20. A lens barrel for holding an imaging optical system that forms an optical image of an object, wherein
the imaging optical system is a zoom lens system that, in order from the object side to the image side, comprises:
a first lens unit having positive optical power;
a second lens unit that includes a reflective optical element having a reflecting surface for bending a light ray from an object and that has negative optical power; and
a subsequent lens unit including at least one lens unit having positive optical power, and that
satisfies the following condition (1):

$$-5.70 < f_1/f_2 < -2.00 \qquad (1)$$

(here, $Z = f_T/f_W > 5.0$)

in which,
f₁ is the composite focal length of the first lens unit,
f₂ is the composite focal length of the second lens unit,
$f_W$ is the focal length of the entire zoom lens system at a wide-angle limit,
$f_T$ is the focal length of the entire zoom lens system at a telephoto limit, and
Z is the magnification variation ratio, and wherein
in an accommodated state, the reflective optical element is fixed at the same position as located in the imaging state.

* * * * *